United States Patent
Ajima et al.

(10) Patent No.: US 7,161,323 B2
(45) Date of Patent: Jan. 9, 2007

(54) MOTOR DRIVE APPARATUS, ELECTRIC ACTUATOR AND ELECTRIC POWER STEERING APPARATUS

(75) Inventors: Toshiyuki Ajima, Hitachi (JP); Hideki Miyazaki, Hitachi (JP); Satoru Kaneko, Naka (JP); Yuuichirou Takamune, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/158,247

(22) Filed: Jun. 22, 2005

(65) Prior Publication Data

US 2006/0001392 A1 Jan. 5, 2006

(30) Foreign Application Priority Data

Jun. 30, 2004 (JP) ............................. 2004-192751

(51) Int. Cl.
*H02J 1/02* (2006.01)
*H02P 27/00* (2006.01)

(52) U.S. Cl. ...................... 318/629; 318/801; 318/560; 363/39; 363/40; 363/41

(58) Field of Classification Search .................... None
See application file for complete search history.

(56) References Cited

U.S. PATENT DOCUMENTS

| | | | | |
|---|---|---|---|---|
| 5,357,181 A * | 10/1994 | Mutoh et al. | ............... | 318/139 |
| 5,967,253 A * | 10/1999 | Collier-Hallman | .......... | 180/421 |
| 6,639,379 B1 * | 10/2003 | Matsushita et al. | ......... | 318/727 |
| 6,674,262 B1 * | 1/2004 | Kitajima et al. | ............ | 318/722 |
| 6,768,280 B1 * | 7/2004 | Kitajima | .................... | 318/432 |
| 6,777,907 B1 * | 8/2004 | Ho | .............................. | 318/801 |
| 6,838,844 B1 * | 1/2005 | Shimizu et al. | ............. | 318/287 |
| 6,906,492 B1 * | 6/2005 | Matsushita | ................... | 318/727 |
| 6,963,182 B1 * | 11/2005 | Suzuki | ....................... | 318/254 |
| 2003/0057913 A1 * | 3/2003 | Matsushita et al. | ......... | 318/727 |
| 2004/0104697 A1 * | 6/2004 | Suzuki | ...................... | 318/254 |
| 2004/0183496 A1 * | 9/2004 | Yoshimoto | ................... | 318/715 |
| 2004/0232865 A1 * | 11/2004 | Suzuki | ....................... | 318/439 |
| 2005/0073280 A1 * | 4/2005 | Yoshinaga et al. | .......... | 318/727 |
| 2005/0241875 A1 * | 11/2005 | Ta et al. | ..................... | 180/443 |
| 2006/0009893 A1 * | 1/2006 | Suzuki | ......................... | 701/41 |
| 2006/0022626 A1 * | 2/2006 | Kobayashi et al. | ......... | 318/432 |

FOREIGN PATENT DOCUMENTS

| | | |
|---|---|---|
| JP | 11-285288 | 10/1999 |
| JP | 2002-345283 | 11/2002 |

* cited by examiner

*Primary Examiner*—Lincoln Donovan
*Assistant Examiner*—Eduardo Colon Santana
(74) *Attorney, Agent, or Firm*—Crowell & Moring LLP

(57) ABSTRACT

The disclosure concerns a a motor drive apparatus, an electric actuator and an electric power steering apparatus capable of continuous torque control up to the high drive speed and high torque area, in order to enable quick acceleration and deceleration. A controller comprises a voltage saturation detecting apparatus for detecting the voltage saturation of the output voltage of an inverter circuit, based on the battery voltage, and a waveform controller that converts the drive waveform of the inverter circuit into the waveform created by superimposing harmonics of high odd-numbered order on a sinusoidal wave as a fundamental wave of the modulated wave modulated by a PWN carrier wave; and continuously changes the ratio of superimposing the high-order harmonics in response to the voltage saturation detected by a voltage saturation detecting means. This arrangement allows the controller to continuously change the drive waveform of the inverter circuit.

11 Claims, 10 Drawing Sheets

FIG. 2(A)
FIG. 2(B)
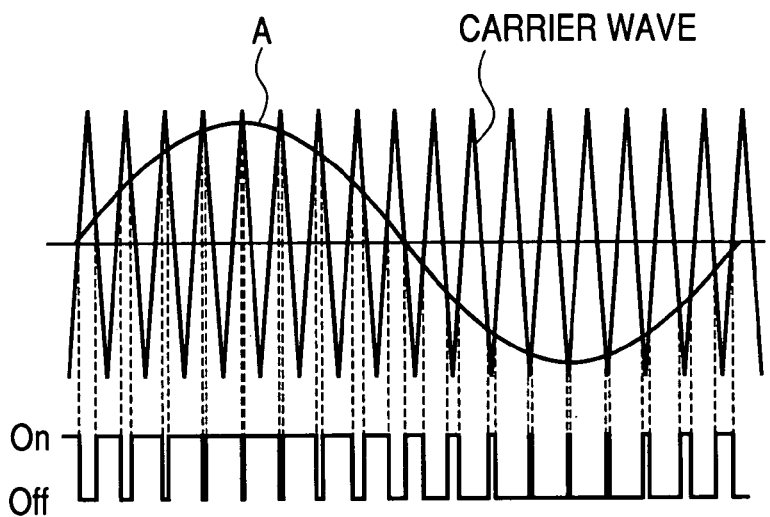
FIG. 2(C)
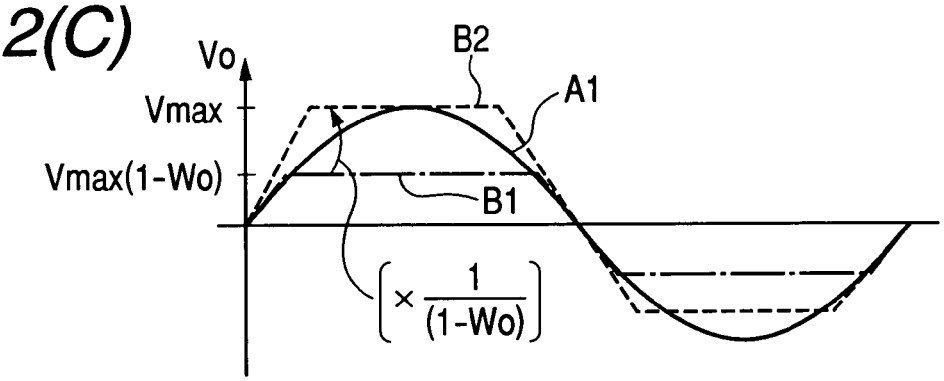
FIG. 2(D)
FIG. 2(E)
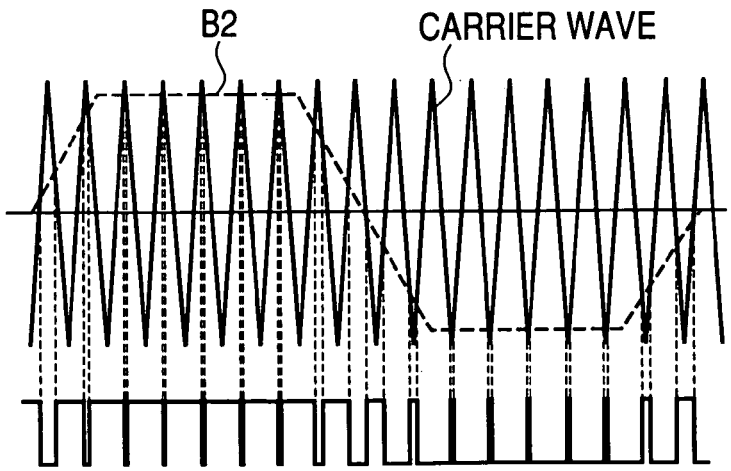

CURRENT DETECTION ERROR RANGE<120 DEGREES

CURRENT DETECTION ERROR RANGE≧120 DEGREES

MOTOR DRIVE APPARATUS, ELECTRIC ACTUATOR AND ELECTRIC POWER STEERING APPARATUS

CLAIM OF PRIORITY

The present application claims priority from Japanese application serial no. 2004-192751, filed on Jun. 30, 2004, the content of which is hereby incorporated by reference into this application.

FIELD OF THE INVENTION

The present invention relates to a motor drive apparatus, an electric actuator and an electric power steering apparatus, particularly to the motor drive apparatus, electric actuator and electric power steering apparatus that are preferably used for quick acceleration and deceleration.

BACKGROUND OF THE INVENTION

In recent years, a power steering apparatus has been developed wherein the steering force of a driver is mitigated under motor control by detecting the steering force of a vehicle. Attention is currently focused on a brushless motor used in this power steering apparatus. The brushless motor has a rotor equipped with a permanent magnet. It drives the inverter circuit in response to the signal of detecting the rotational position as the position of the magnetic pole of the permanent magnet of the rotor. Thus, the magnetic field for rotation is produced in the stator to provide a highly efficient output. Since it is a brushless motor, it provides a long service life.

The brushless motor is controlled by either a 120-degree drive method characterized by a simpler configuration of the drive apparatus or by a 180-degree drive method for providing a smoother output torque. The 180-degree drive method is commonly employed in the electric power steering apparatus and others involving a problem with pulsation of the motor output torque (hereinafter referred to as "motor torque").

A sinusoidal wave drive method is commonly used to reduce the vibration and noise of a brushless motor. In this case, the maximum voltage applicable to the motor is $\sqrt{3}/2$ (approximately 86.6%) of power voltage Ed. However, the electric power steering apparatus and others is required to provide the assist force (motor drive speed and motor torque) of an electric actuator in order to ensure a quick response to sudden steering wheel operation. This requires a higher applied voltage to be delivered to the brushless motor from the inverter circuit.

To solve this problem, the following technique is commonly known, as disclosed in the Japanese Patent Laid-open No. 2002-345283, for example. The motor is controlled according to sinusoidal wave drive method in the normal mode. When high speed drive and high torque are required (in the torque priority mode), this method is switched over to the trapezoidal wave or rectangular wave drive method.

In this case, if the sinusoidal wave drive is switched over to the rectangular wave drive, a big fluctuation in the applied voltage is caused by the difference in the waveform component at the time of switching, with the result that a fluctuation in the motor output torque occurs. To solve this problem, the amplitude of the modulated wave is increased relative to the PWM modulated wave, as disclosed in the Japanese Patent Laid-open No. Hei 11 (1999)-285288, for example. Then the drive method is switched over to the 1-pulse rectangular wave drive method through the intermediate waveform between the sinusoidal wave and the trapezoidal wave, while the voltage is saturated. At the same time, phase control is provided in such a way as to minimize the torque fluctuation at the time of switching operation. Such a control technique is commonly known.

SUMMARY OF THE INVENTION

However, the aforementioned technique requires the drive waveform to be switched from the sinusoidal wave over to the rectangular wave, based on evaluation of the motor operation stator. Accordingly, the following problems occur: (1) A fluctuation in torque occurs at the time of switching. (2) A certain period of switching time or width in the switching area is necessary. (Particularly, the phase of the voltage applied to the motor cannot be changed at once.) (3) Discontinuous control at the time of switching and reduced control stability. Further, in the actuator capable of quick acceleration and deceleration up to the high torque range, a hunting problem tends to occur to the switching processing section, with the result that smooth torque control cannot be obtained, according to the prior art.

Further, use of a plurality of current sensors is essential to ensure smooth torque control to reach the high drive speed and high torque area. If an error has occurred to the detection value of these multiple current sensors, torque control fail. This requires the motor drive to be suspended (failed). Thus, the motor drive cannot be continued. Such a problem has been found in the prior art.

In view of the prior art described above, it is an object of the present invention to provide a motor drive apparatus, electric actuator and electric power steering apparatus capable of continuous torque control up to the high drive speed and high torque area, within the operation range of the actuator performing quick acceleration and deceleration.

Another object of the present invention is to provide a motor drive apparatus, electric actuator and electric power steering apparatus capable of continuous torque control up to the high drive speed and high torque area, without any failure even when a detection error has occurred to the current sensor.

[MEANS FOR SOLVING THE PROBLEMS]

(1) To achieve the aforementioned first object, the present invention provides a motor drive apparatus comprising a 3-phase a.c. driven motor; an inverter for driving the aforementioned motor based on a battery voltage; a first current detector for detecting a direct current flowing to the aforementioned inverter; a plurality of second current detectors for detecting the motor current flowing to the aforementioned motor; and a controller for controlling the drive of the aforementioned inverter based on the current value detected by the aforementioned first and/or second current detectors, and for driving the motor while controlling the torque of the aforementioned motor. In this motor drive apparatus, the aforementioned controller converts the drive waveform of the aforementioned inverter into the waveform created by superimposing harmonics of high odd-numbered order on a sinusoidal wave as a fundamental wave of the modulated wave modulated by a PWN carrier wave; and continuously changes the ratio of superimposing the aforementioned high-order harmonics, based on the aforementioned battery voltage.

This structure ensures continuous torque control up to the high drive speed and high torque area, within the operation range of the actuator performing quick acceleration and deceleration.

(2) The motor drive apparatus described in the aforementioned Structure (1) wherein the aforementioned controller preferably comprises a voltage saturation detecting unit for detecting the saturation of the aforementioned inverter output voltage based on the aforementioned battery voltage; and a waveform control unit for converting the drive waveform of the aforementioned inverter into the waveform created by superimposing harmonics of high odd-numbered order on a sinusoidal wave as a fundamental wave of the modulated wave modulated by a PWN carrier wave; and for continuously changing the ratio of superimposing the aforementioned high-order harmonics, in response to the degree of voltage saturation measured by the aforementioned voltage saturation detecting unit.

(3) The motor drive apparatus described in the aforementioned Structure (1), preferably further characterized in that the aforementioned controller comprises:

a step of obtaining the voltage command value from the deference between a current command value based on a torque command value and the current value detected by said first and/or second current detectors;

a step of calculating a superimpose ratio based on the voltage of said battery as a parameter; and a step of superimposing the high odd-numbered order harmonics on the fundamental sinusoidal wave in accordance with said superimpose ratio.

(4) The motor drive apparatus described in the aforementioned Structure (1), preferably further comprising a rotating position detector for detecting the rotating position of the aforementioned motor. This controller comprises a step of controlling the motor current based on the vector control according to the torque current command (q-axis current command) and exciting current command (d-axis current command); and a step of controlling the aforementioned motor current based on the rotating position of the rotor detected by the aforementioned rotating position detector.

(5) The motor drive apparatus described in the aforementioned Structure (1), preferably further characterized in that the aforementioned controller comprises a current correcting unit. This controller comprises:

a step of comparing the direct current value detected by the first current detector with the motor current detected by the second current detectors;

a step of detecting the detection error level of the current detector; and a step of obtaining the motor current value of the faulty phase, using the motor currents of other two phases, if the detection error range for the motor current value of any one phase in the three-phase motor current values is narrower than a predetermined electrical angle.

(6) The motor drive apparatus described in the aforementioned Structure (5), preferably further characterized in that, if the detection error range for the motor current value of at least one phase in the three-phase motor current values is greater than a predetermined electrical angle, the aforementioned current correcting unit estimates the motor current value of the faulty phase using the motor currents of other phases and the aforementioned direct current values.

(7) The motor drive apparatus described in the aforementioned Structure (5), preferably further characterized in that the aforementioned waveform control unit converts the drive waveform into a 120-degree rectangular wave if a detection error level has been detected to be within the range involving difficulties in detecting all the motor current values at the same time.

(8) The motor drive apparatus described in the aforementioned Structure (5), preferably further characterized in that the aforementioned current correcting unit compares the aforementioned direct current instantaneous value with the aforementioned motor current value at intervals of 60-degree period in terms of motor electrical angle, and detects the detection error level, wherein the direct current value whose resolution is equivalent to or higher than the resolution of the aforementioned motor current value is used as an input; and the peak value within the PWM period of the aforementioned direct current value having been detected is held as the direct current instantaneous value.

(9) To solve the aforementioned second object, the present invention provides a motor drive apparatus comprising:

a 3-phase a.c. driven motor;

an inverter for driving the aforementioned motor based on a battery voltage;

a first current detector for detecting a direct current flowing to the aforementioned inverter;

a plurality of second current detectors for detecting the motor current flowing to the aforementioned motor; and a controller for controlling the drive of the aforementioned inverter based on the current value detected by the aforementioned first and/or second current detectors, and for driving the motor while controlling the torque of the aforementioned motor.

In this motor drive apparatus, the aforementioned controller comprises a step of comparing the direct current value detected by the first current detector with the motor current detected by the second current detectors; a step of detecting the detection error level of the current detector; and a step of obtaining the motor current value of the faulty phase, using the motor currents of other two phases, if the detection error range for the motor current value of any one phase in the three-phase motor current values is narrower than a predetermined electrical angle.

This structure ensures continuous torque control up to the high drive speed and high torque area, without any failure even when a detection error has occurred to the current sensor.

(10) To solve the aforementioned first object, the present invention provides a motor drive apparatus comprising:

a 3-phase a.c. driven motor;

an inverter for driving the aforementioned motor based on a battery voltage;

a first current detector for detecting a direct current flowing to the aforementioned inverter;

a plurality of second current detectors for detecting the motor current flowing to the aforementioned motor;

a controller for controlling the drive of the aforementioned inverter based on the current value detected by the aforementioned first and/or second current detectors, and for driving the motor while controlling the torque of the aforementioned motor; and a torque transmitter for transmitting the drive torque of the aforementioned motor to a driven member.

In this motor drive apparatus, the aforementioned controller converts the drive waveform of the aforementioned inverter into the waveform created by superimposing harmonics of high odd-numbered order on a sinusoidal wave as a fundamental wave of the modulated wave modulated by a PWN carrier wave; and continuously changes the ratio of superimposing the aforementioned high-order harmonics, based on the aforementioned battery voltage.

This structure ensures continuous torque control up to the high drive speed and high torque area, within the operation range of the actuator performing quick acceleration and deceleration.

(11) To solve the aforementioned first object, the present invention provides an electric power steering apparatus comprising the electric actuator described in said (10).

This structure ensures continuous torque control up to the high drive speed and high torque area, within the operation range of the actuator performing quick acceleration and deceleration.

The present invention ensures continuous torque control up to the high drive speed and high torque area, within the operation range of the actuator performing quick acceleration and deceleration.

The present invention ensures continuous torque control up to the high drive speed and high torque area, without any failure even when a detection error has occurred to the current sensor.

BRIEF DESCRIPTION OF DRAWINGS

FIG. 2 is a waveform chart representing the operation of the waveform controller 51 used in the motor drive apparatus as an embodiment of the present invention;

DESCRIPTION OF THE PREFERRED EMBODIMENTS

Figure 1:
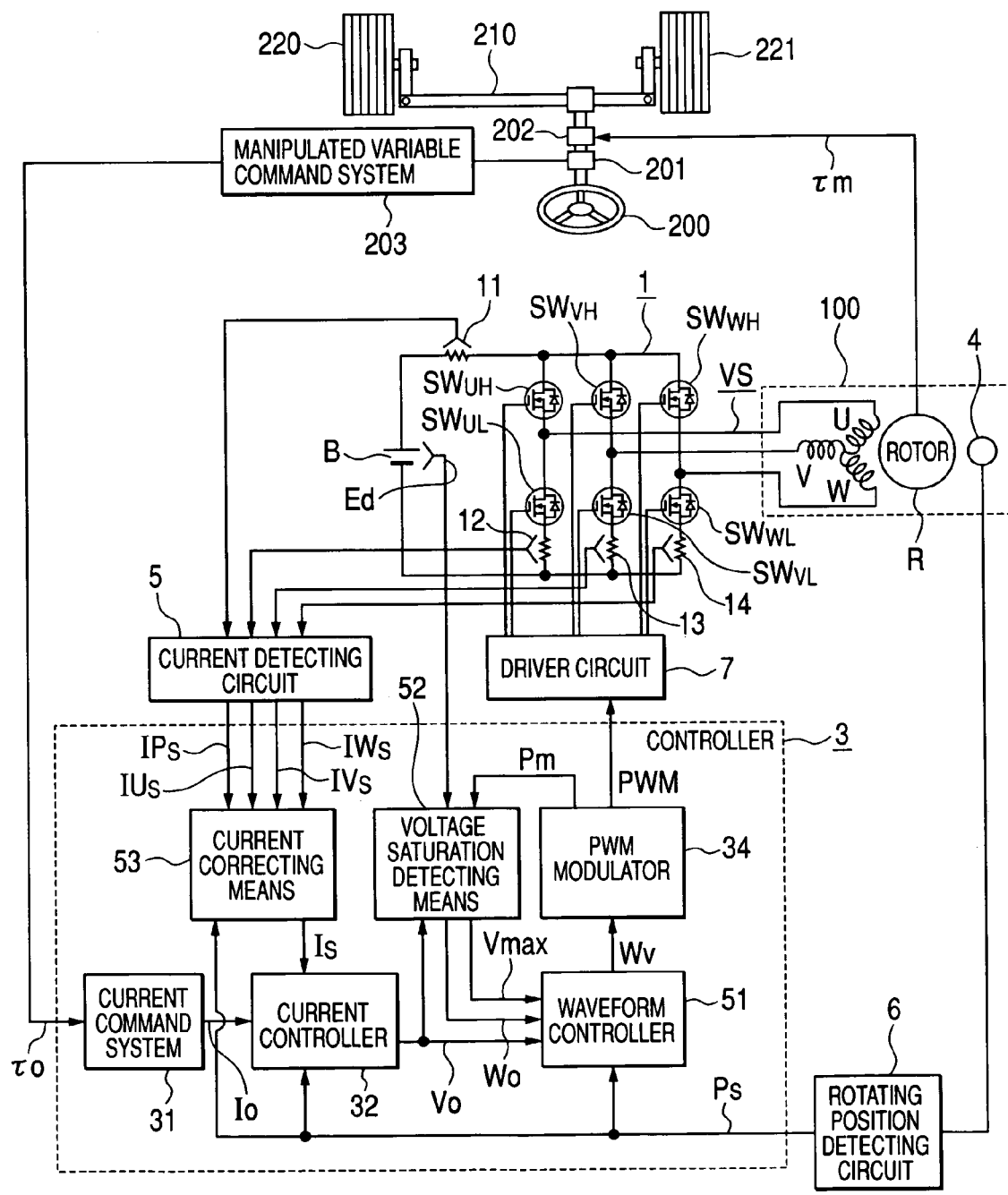
FIG. 1 is a block diagram representing the configuration of an electric power steering apparatus wherein the motor drive apparatus as an embodiment of the present embodiment is used as an electric actuator.

Referring to the drawings 1 through 7, the following describes the configuration and the operation of a motor drive apparatus as an embodiment of the present invention: The following description refers to an example of the electric power steering apparatus wherein the motor drive apparatus of the present embodiment is used as an electric actuator. In addition to the permanent magnet synchronous motor (brushless d.c. motor), any other motor that can be a.c. driven, permanent magnet synchronous motor, can be used as the a.c. driven motor, without the present invention being restricted to the following example. Further, it is also applicable to the electric braking apparatus wherein the motor drive apparatus is used as an electric actuator.

In the first place, the following describes the configuration of the electric power steering apparatus wherein the motor drive apparatus of the present embodiment is used as an electric actuator, with reference to FIG. 1:

FIG. 1 is a block diagram representing the configuration of the electric power steering apparatus wherein the motor drive apparatus of the present embodiment is used as an electric actuator.

The motor drive apparatus is mainly composed of an inverter circuit 1 and a controller 3. The electric actuator is mainly composed of a torque transmission mechanism 202, a motor 100, and the aforementioned motor drive apparatus. The power steering apparatus is mainly composed of the aforementioned electric actuator steering wheel 200, a steering detector 201, and a manipulated variable command system 203.

In the power steering apparatus, the operation force of the steering wheel 200 (steering) steered by a driver is torque-assisted by the driving force of the electric actuator. The torque command To for the electric actuator is the steer-assisted torque command of the steeling created by the manipulated variable command system 203. The power steering apparatus uses the output of the electric actuator to reduce the steering force of the driver.

The torque command τo as an input command is inputted into the controller 3 of the motor drive apparatus. Current command value Io is created from the torque constant of the drive motor 100 and torque command τo. The waveform of the voltage applied to the inverter circuit 1 is controlled in such a way as to find agreement between the current command value Io and motor current value Is (Ius, Ivs and Iws).

The following describes the details of each section:

The inverter circuit 1 switches the battery voltage Ed and applies it to the three-phase armature windings (U, V and W) of the brushless d.c. motor 100 as the three-phase motor applied voltage Vs (Vsu, Vsv and Vsw). Then it drives and rotates the rotor of the permanent magnet. The motor applied voltage Vs is synonymous with the output voltage of the inverter circuit 1.

The rotating position detector 4 detects the rotating position (magnetic pole position) of the rotor R of the motor 100. A resolver, encoder, hall IC, hall device or magnetic resistor device can be used as the rotating position detector 4. A rotating position detecting circuit 6 outputs the signal detected by the rotating position detector 4 as the rotor magnetic pole position θ (sampled angle position Ps). In terms of mechanical angle, one rotor rotation is steering wheel as mechanical 360 degrees. In terms of electrical angle, the rotor magnetic pole (pole pair) has electrical 360 degrees. The mechanical 360 degrees/number of pole pairs is equivalent to electrical 360 degrees. When a 10-pole 12-slot motor is used as a brushless d.c. motor 100, mechanical 36 degrees are equivalent to electrical 360 degrees.

For the motor output τm delivered from the output shaft directly coupled with the rotor R of the motor (brushless d.c. motor) 2, the torque is transmitted to the rack 210 of the steering apparatus through a torque transmission mechanism 202 using a speed reduction mechanism such as a worm, wheel and planetary gear. Thus, the steering force (operation force) of the steering wheel 200 of a driver is mitigated (assisted) by electric power, whereby the wheels 220 and 221 are driven. This assisted volume (manipulated variable)

is detected as the steering angle and steering torque by a steering detector 201, built in the steering shaft, for detecting the state of steeling. The manipulated variable command system 203 is outputted as a torque command TO, with consideration given to such a state volume as the vehicle speed and road surface conditions.

Six switching devices S WUH, S WUL, S WVH, S WVL, S WWH and S WWL constituting the inverter circuit 1 consist of a field-effect transistor (FET) and others. Drive signals are sent from the driver circuit 7 to the gate terminals of the switching devices S WUH, S WUL, S WVH, S WVL, S WWH and S WWL to perform on-off operation of each of the switching devices S WUH, S WUL, S WVH, S WVL, S WWH and S WWL. The drive signal includes dead time to ensure that the switching device of the vertical arm is not turned on at the same time. The FET is connected to the high side H (positive pole side of battery B) and low side L (negative pole side of battery B). The mid-points of a pair of arms are connected to the armature windings U, V and W of the motor 100.

The motor currents flowing through the windings U, V and W of each motor are detected as the terminal voltages of shunt resistors (N-shunt) 12, 13 and 14. The direct current flowing to the inverter circuit 1 is detected as the terminal voltage of the shut resistor (P-shunt) 11 connected between the low-side FET and the positive pole of the battery B. The voltages detected by the shunt resistors 11, 12, 13 and 14 are separated from the noise components by such an electronic circuit as a differential amplifier located inside the current detecting circuit 5, and are outputted as motor current detection values IUs, IVs and IWs and direct current detection value IPs after the signals have been amplified. In this case, shunt resistors are used as current detectors. However, it is also possible utilize other devices for detecting the current, such as non-contact current transformers or (CT) Hall CTs.

The controller 3 receives the torque command To as input commands from the manipulated variable command system 203. Using the motor current detection values IUs, IVs and IWs, direct current detection value IPs, and angular position Ps, the controller 3 outputs the PWM-modulated drive signal PWM (control signal) to the driver circuit 7 so as to agree with the torque command to. In this manner, the controller 3 drives the inverter circuit 1 and controls the drive of the brushless d.c. motor 100.

The controller 3 comprises a current command system 31, a current controller 32, a PWM modulator 34, a waveform controller 51, a voltage saturation detecting means 52 and a current correcting means 53.

Using the torque constant of the motor, the current command system 31 converts the torque command τo into the inputted current command value Io (torque current command (q-axis current command) and exciting current command (d-axis current command) so as to provide vector control of the inputted torque command τo.

Based on the motor current detection values IUs, IVs and IWs, and direct current detection value IPs detected by the current detecting circuit 5, and angular position Ps detected by the rotating position detecting circuit 6, the current correcting means 53 makes a comparison between the motor current detection values IUs, IVs and IWs, and direct current detection value IPs, detects them as the detection error levels of a plurality of current detectors. It corrects the motor current detection values IUs, IVs and IWs in conformity to the detection error levels, and outputs motor current value Ip (IU, IV, IW) subsequent to correction. The details of the current correcting means 53 will be described later.

The current controller 32 outputs the output voltage command value Vo (torque voltage value Vq (q-axis voltage value) and exciting current command Vd (d-axis current command)) to ensure that current command value Io issued by the current command system 31 will agree with the current value Ip (composed of torque current command (q-axis current command) and exciting current command (d-axis current command)) corrected by the current correcting means 53.

In the meantime, the voltage saturation detecting means 52 finds the voltage saturation W0, based on the value obtained by dividing the peak voltage value Vmax by the magnitude |Vo| of the output voltage value Vo or the maximum value of the PWM modulation rate signal Pm, and outputs it. In this case, the peak voltage value Vmax is defined as the peak value of the motor applied voltage determined by the battery voltage Ed. To put it another way, voltage saturation W0 refers to the detection level on which the output voltage of the inverter circuit 1 (motor applied voltage waveform) identifies the controllable pattern of the motor applied voltage waveform under the restriction of the battery voltage Ed.

Subsequent to two- or three-phase conversion of the output voltage value Vo, the waveform controller 51 converts the waveform from the sinusoidal wave to the rectangular wave by clamping the waveform on the level of Vmax (1−voltage saturation W0). Further, the waveform controller 51 corrects the wave height value by multiplying the waveform-clamped value by 1/(1−voltage saturation W0) and issues the PWV modulated wave Wv. In this case, voltage saturation W0<1. This arrangement enables continuous waveform control synchronously with the voltage saturation W0. This, the peak value of the applied voltage is subjected to PWM modulation without reaching the saturation voltage, and the applied voltage waveform is placed under control. The operation of the waveform controller 51 will be described later in details.

The PWM modulator 34 makes a comparison between the PWV modulated wave Wv issued by the waveform controller 51 and the carrier wave, and creates a PWM pulse. At the same time, it outputs the maximum pulse width, out of the PWM pulse widths corresponding to three phases, as the PWM modulation rate signal Pm (<1).

The following describes the operation of the waveform controller 51 used in the motor drive apparatus with reference to FIG. 2:

FIG. 2 is a waveform chart representing the operation of the waveform controller 51 used in the motor drive apparatus as an embodiment of the present invention.

FIG. 2(A) shows the carrier wave CARRY of the PWM pulse and modulated wave (sinusoidal wave) A. If the PWV modulated wave Wv outputted from the waveform controller 51 shown in FIG. 1 is a sinusoidal wave, the PWM modulator 34 outputs the sinusoidal wave-modulated PM pulse signal PWM as shown in FIG. 2(B), to the inverter circuit 1 through the driver circuit 7.

In FIG. 2(C), the solid line A1 indicates the sinusoidal PWV modulated wave Wv outputted from the waveform controller 51. The wave height value is represented by Vmax. In this case, if the voltage of the battery B has reduced below the standard 12 volts (for a 14-volt battery), the voltage saturation W0 is reduced below 1. In this case, the waveform controller 51 voltage-clamps the sinusoidal wave at the clamp value of (Vmax×(1−W0), as shown by the one-dot chain line, with reference to the sinusoidal wave indicated by the solid line A1. Further, the waveform controller 51 normalizes the clamped value by multiplying it by (×1/(1−W0)) in such a way that the wave height value will be Vmax. Then the waveform controller 51 generates the PWV modulated wave Wv indicated by a broken line B1, and outputs it to the PWM modulator 34.

Using the PWM modulated wave Wv indicated by the broken line B1, the PWM modulator 34 performs modulation with the PWM carrier wave shown in FIG. 2(D) and generates PWM pulse signal shown in FIG. 2(E). Then the PWM modulator 34 sends it to the inverter circuit 1 through the driver circuit 7. The PWM pulse signal shown in FIG. 2(E) is the signal formed by superimposition of harmonics of high odd-numbered order such as order 3, 5 and 7 upon the sinusoidal wave.

As described above, the waveform controller 51 voltage-clamps the PWM modulated wave in response to the voltage saturation W0, and converts the PWM pulse outputted from the PWM modulator 34, from the sinusoidal wave to the signal formed by superimposition of harmonics of high odd-numbered order upon the sinusoidal wave. At the same time, the clamped value is changed continuously in response to the degree of voltage saturation in this case. This allows the waveform to be changed continuously from the sinusoidal wave to the signal formed by superimposition of harmonics of high odd-numbered order upon the sinusoidal wave. Thus, in an actuator capable of quick acceleration and deceleration, this arrangement ensures continuous waveform control by the PWM modification, without the need of switching the drive waveform, and provides stable torque control up to the high drive speed and high torque area.

The controller 3 can be either an analog or digital controller. Use of a circuit using a microcomputer capable of programming will ensure easy performance of complicated processing.

Referring to FIG. 3, the following describes the operation range of the electric actuator of the present embodiment.

Figure 3A:
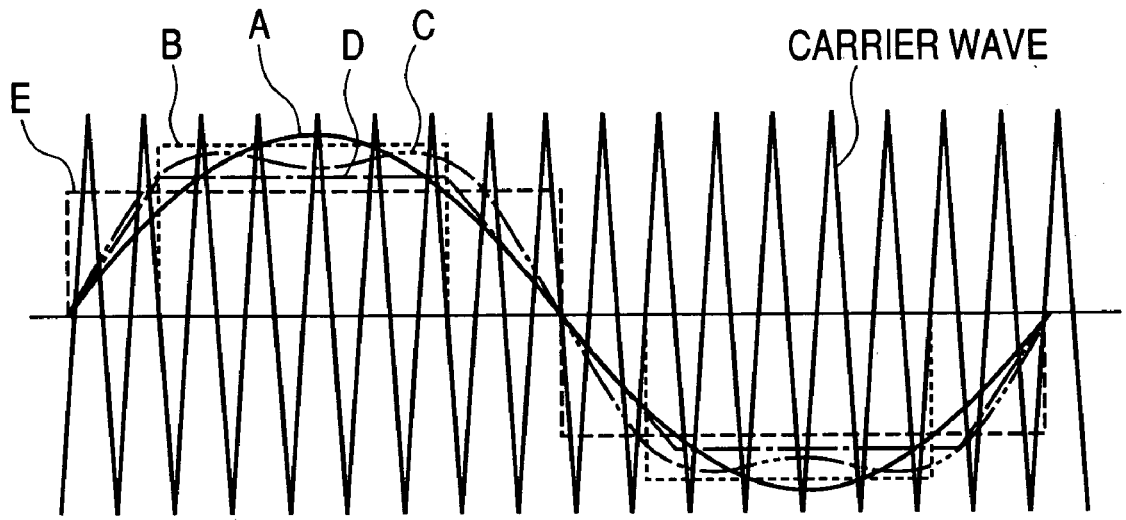
FIG. 3 is an explanatory diagram showing the operation range of the electric actuator of the present invention.
Figure 3B:
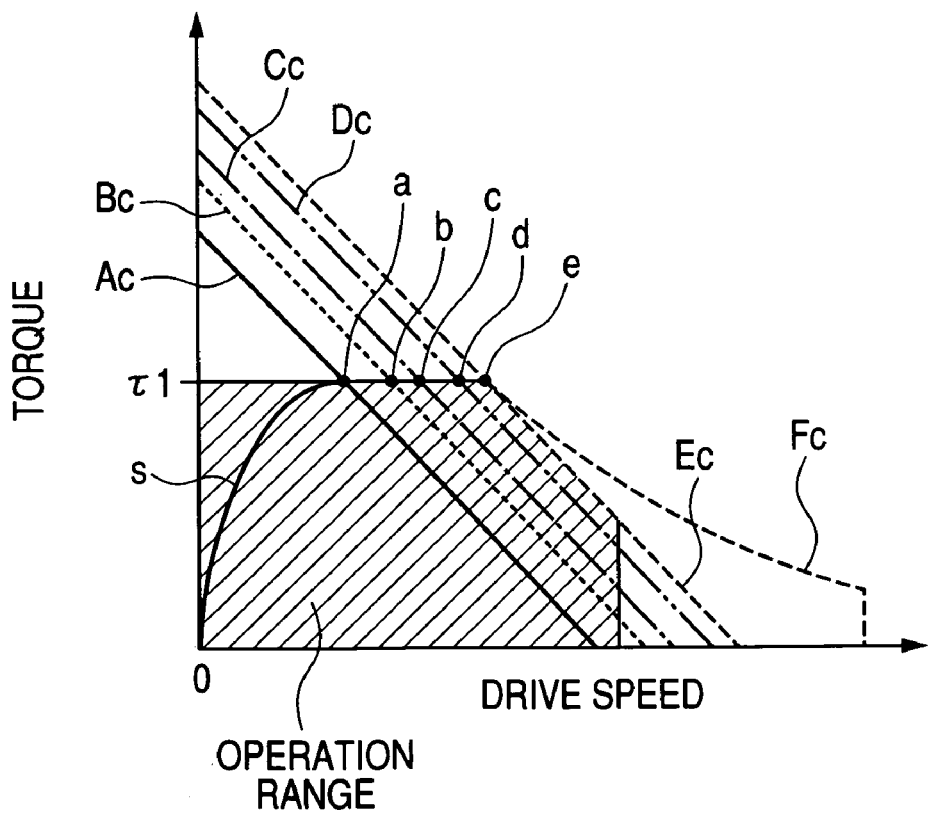

FIG. 3 is an explanatory diagram showing the operation range of the electric actuator of the present invention. FIG. 3(A) shows a typical PWM modulated waveform and FIG. 3(B) shows the relationship between the motor applied voltage waveform and motor characteristics.

FIG. 3(A) shows only the typical PWM modulated waves alone. The PWV modulated wave Wv of the present embodiment undergoes a continuous waveform change, and includes the intermediate waveforms that are not illustrated. The motor applied voltage waveform is determined according to the PWV modulated wave Wv. When the PWM modulated wave Wv is controlled, the applied voltage waveform of the motor is also placed under control.

The typical PWM modulated wave Wv includes a sinusoidal wave A (solid line), a third harmonic superimposed on the sinusoidal wave plus a third harmonic C (one-dot chain line), a trapezoidal wave D (two-dot chain line), a rectangular wave E (wavy line), and a 120-degree rectangular wave B rectangular only in the 120-degree section (dotted line). The PWM modulated wave Wv of the present embodiment includes a sinusoidal wave and a waveform formed by superimposition of harmonics of high odd-numbered order upon the sinusoidal wave. The waveform formed by superimposition of harmonics of high odd-numbered order upon the sinusoidal wave has a characteristic similar to the sinusoidal wave plus third harmonic C. Further, the waveform formed by superimposition of harmonics of high odd-numbered order upon the sinusoidal wave is closer to the trapezoidal wave D as the waveform clamp value is smaller.

Assuming that the wave height value of each PWM modulated wave is fixed at "1" (equivalent to the battery voltage kept constant), a comparison is made of the magnitude of the basic fundamental wave components. Sinusoidal wave A=1.00, 120-degree rectangular wave B=1.10, sinusoidal wave+third harmonic C=1.15, trapezoidal wave D=1.21, and rectangular wave E=1.27. For the waveform formed by superimposition of harmonics of high odd-numbered order on the sinusoidal wave, the magnitude of the fundamental wave component contained in the waveform is greater. This means that a great output torque can be obtained.

In terms of effective values, sinusoidal wave A=0.707, 120-degree rectangular wave B=0.816, sinusoidal wave+third harmonic C=0.834, trapezoidal wave D=0.882, and rectangular wave E=1. Although the motor output can be obtained, there is an increase in the amount of the harmonic components contained therein, with the result that torque pulsation will occur. However, mutual cancellation occurs in the specific odd-numbered harmonic component including the third harmonic, when viewed as the three-phase a.c. motor line voltage, and hence there is no flow as a motor current. To put it another way, for the sinusoidal wave+third harmonic wave C, there is an increase in the fundamental wave alone. There is no flow of harmonic component current that may cause a torque ripple. This can be said to be an ideal state.

Referring to FIG. 3(B), the following describes the motor characteristics required to cover the operation range of the electric power steering apparatus. The operation range of the electric power steering apparatus corresponds to the hatched area in the drawing. The motor characteristic in each of the PWM modulated waves (A, B, C, D and E) is represented by (Ac, Bc, Cc, Dc and Ec), and the motor characteristic Fc exhibits the motor characteristic when phase control (field weakening control) is added in the rectangular wave E. Phase control can be provided in other PWM modulated waves. It is possible to get the same curve characteristics as those when the motor characteristic Fc has been subjected to parallel translation. Thus, phase control should be provided, as required. The operation points a, b, c, d and e show the intersections between the motor characteristics (Ac, Bc, Cc, Dc and Ec) and operation curve s in the PWM modulated waves (A, B, C, D and E).

The vibration occurring to the steering wheel as an electric power steering apparatus is required to be minimized wherever possible. The vibration transmitted to the steering wheel is mainly the vibration component resulting from the torque pulsation (fluctuation) of the motor. This requires the motor torque pulsation to be taken into account when selecting the PWM modulated wave shown in FIG. 3 and the motor characteristics. When attention is paid to the torque pulsation, the priority of the PWM modulated wave is given in the order of sinusoidal wave A, sinusoidal wave+third harmonic C, trapezoidal wave D, rectangular wave E and 120-degree rectangular wave B.

When attention is paid to the motor characteristics, priority of the PWM modulated wave is given in the order of rectangular wave E, trapezoidal wave D, sinusoidal wave+third harmonic C, 120-degree rectangular wave B and sinusoidal wave A.

To be more specific, adequate selection among the PWM modulated waves (A, B, C, D and E) is preferred in response to the required loaded condition or controlled state of the motor for the electric actuator of the electric power steering apparatus and the motor drive apparatus. However, in the method of switching among the PWM modulated waves, the following problems arise: (1) Discontinues control occurs at the switching point. (2) Switching evaluation time is required at the time of operation switching, for example, to prevent hunting. Accordingly, the method of switching the PWM modulated wave between sinusoidal wave and rectangular wave cannot be easily applied to the electric actuator of the electric power steering apparatus subjected to quick acceleration and deceleration.

In the present embodiment, for the waveform formed by superimposition of harmonics of high odd-numbered order on the sinusoidal wave, the degree of superimposition is changed in response to the degree of voltage saturation. This arrangement allows continuous control of the PWM modulated wave, and hence ensures smoother continuous torque control.

Ideal application of the 120-degree rectangular wave B of the PWM modulated wave is achieved only in a special case where an error has occurred to the current detector. This will be described later.

To show an example of the operation of the controller 3, assume the case wherein the steering wheel 200 of a vehicle is operated (switching operation) when the vehicle is stopped placed in a garage or the like, and torque τ1 within the operation range is required as the motor output. There is a sudden startup of the rotational speed and torque at the time of the operation start of the steering wheel 200 with the vehicle stopped. The shear stress applied to the tires 220 and 221 is determined by the relationship between the friction coefficient of the road surface and steering wheel operation speed. This requires a great deal of the assist force. In order to ensure a large steering angle, the operation of the steering wheel 200 is continued at a high speed. This results in an operation curve s asymptotical to the torque τ1, as shown in FIG. 3(B). Here the maximum rotation speed depends on the operation speed of the steering wheel 200. For ease of explanation of the operation, assume a transition of operation points a, c, d and e in that order. For the sake of expediency, the torque value of operation points a, b, c, d and e is assumed as torque τ1. The torque value is not always the same because of the manipulated variables (speed, etc.).

The most frequently operated area in the electric power steering apparatus is the area that can be reached by the motor characteristic Ac. The intersection with the operation curve s corresponds to the operation point a. Assuming a very quick operation of the steering wheel for static steering and others, the highest possible motor output is expected. Driving is preferred to be carried out up to the intersection between the motor characteristic Ec and operation curve s. However, although the motor characteristic Ec has a high motor output, there is also a high degree of torque pulsation. When the motor output and torque pulsation is taken into account, there is a transition between the intersection c between the intermediate motor characteristic Cs and operation curve s and the intersection d between the motor characteristic D and operation curve s. Here the PWM modulated waves A, C, D and E are the typical characteristics. The motor characteristics Ac, Cc, Dc and Ec are also the typical characteristics.

The controller 3 of the present embodiment allows continuous outputting of the intermediate waveforms represented by these typical waveforms, and therefore the motor characteristics conform to them. To be more specific, there is a continuous transition of the tradeoffs of the relationship between the motor characteristics conforming to the required motor output and the minimum torque pulsation, thereby forming operation curve s that exhibits a smooth and continuous transition of the optimum points of tradeoff in response to quick acceleration and deceleration.

The motor characteristic Ec permits the torque pulsation to be maximized. Since the motor is rotating at a high speed, the frequency of the torque pulsation becomes high. The level of vibration does not reach the point where the driver perceives vibration and assumes it as an operation failure. This description is also application to the intermediate motor characteristic. It is also possible to make such an arrangement as to reduce the types of the PWM modulated waves to be applied, by using the sinusoidal wave plus third harmonic from the beginning, instead of the sinusoidal wave A. This arrangement will simplify the control procedure.

The following advantages can be expected from the use of the sinusoidal wave A: To get the small output torque, average applied voltage is relatively small, and there is an increase in the PWM pulse width of the lower arm for detecting the current with reference to other PWM modulated waves (sinusoidal wave plus third harmonic C, etc.). Thus, (1) this arrangement improves the detection accuracy of the motor current synchronized with the PWM pulse width. (2) The amount of the voltage harmonic component is reduced, whereby radiant noise can be reduced.

To put it another way, wise choice between the sinusoidal wave and the sinusoidal wave plus odd-numbered high-order harmonic is essential. Means have been provided to ensure that the degree of voltage saturation is superimposed on the third harmonic within the range of a predetermined level (where the peak value of the applied voltage does not reach the saturation value), and that the magnitude of the third harmonic is controlled in conformity to the degree of the voltage saturation. Continuous control of the PWM modulated wave provides smooth and continuous torque control.

The motor characteristic Fc is required in the area where the quick operation of the steering wheel is required although the assist force is relatively small on the frozen road where the friction coefficient between the tires 220 and 221 and road surface is small (small torque but high rotational speed). This can be achieved by adding phase control (field weakening control) to the motor characteristic Ec. In this case, a two-degree-of-freedom (voltage and phase) will be satisfactory. There is no problem with the use of a one-pulse-like rectangular wave where the voltage is saturated, if located on the line of motor characteristic Fc. In this case, the applied voltage waveform is placed under the one-degree-of-freedom control. Further, phase control can be provided for the motor characteristics Ac, Cc and Dc.

Referring to FIGS. 4 and 5, the following describes the method for detecting the current, the method for calibrating the current detection value at the time of current detection failure, or the method of estimating the current detection value in the motor drive apparatus of the present embodiment.

FIG. 4 is an explanatory diagram showing the method for current detection in a motor drive apparatus of the present embodiment.

FIG. 5 is an explanatory diagram showing the method for calibrating the current detection value at the time of current detection failure in the motor drive apparatus of the present embodiment.

FIG. 4 shows the operation of current detection in a motor drive apparatus.

Figure 4A:
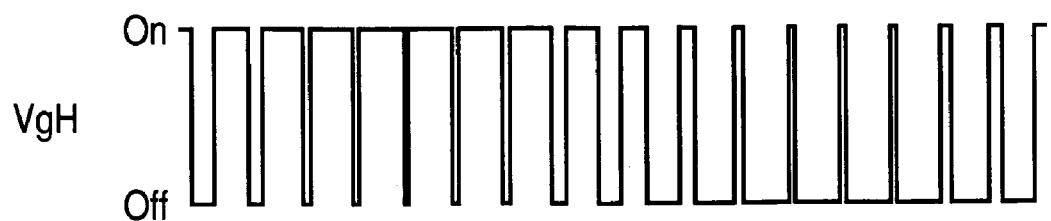
FIG. 4 is an explanatory diagram showing the method for current detection in a motor drive apparatus as an embodiment of the present embodiment.

The PWM pulse VgH shown in FIG. 4(A) indicates the PWM modulated pulse signal.

As shown in FIG. 2(B), after having undergone sinusoidal wave-modulation by the PWM modulator 34, this signal is inputted to the gate terminal of the FET on the high side (V-phase high-side FET) of the inverter circuit 1. The gate signal of the FET (SWVL) on the low side connected to the armature winding V (V-phase low-side FET) is the reverse signal of the PWM pulse VgH. To ensure that the inverter circuit 1 does not cause a short circuit with the arm, the gate signals of the V-phase high-side FET and V-phase low-side FET are provided with dead time so that they will not be turned on simultaneously.

Figure 4B:
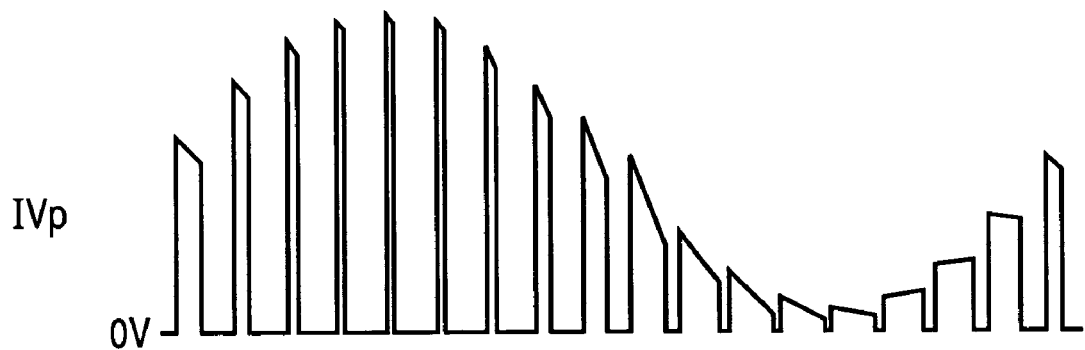

The current flowing to the armature winding V (V-phase motor current) is detected as the terminal voltage of the shunt resistor 13 and is detected as the motor current detection current IVs by the current detecting circuit 5, as shown in FIG. 4(B). Since the current is detected by the source side of the low-side FET, and the current in the section where the V-phase high-side FET is turned on (the PWM pulse VgH is on) does not flow to the shunt resistor 13, it may not be detected. When the V-phase high-side FET is off (PWM pulse SgH is off), the V-phase motor current flows through the V-phase low-side FET (including the body diode built in the FET) and the shunt resistor 13. Accordingly, it is detected as the V-phase motor current.

When a microcomputer is used to produce the controller 3, the shunt voltage waveform IVp detected across the shunt resistor is formed like a pulse, and is detected by the analog-to-digital converter so as to be synchronized with the center of the pulse waveform. It is subjected to level conversion in the microcomputer to find the V-phase motor current detection value IVs.

Figure 4C:
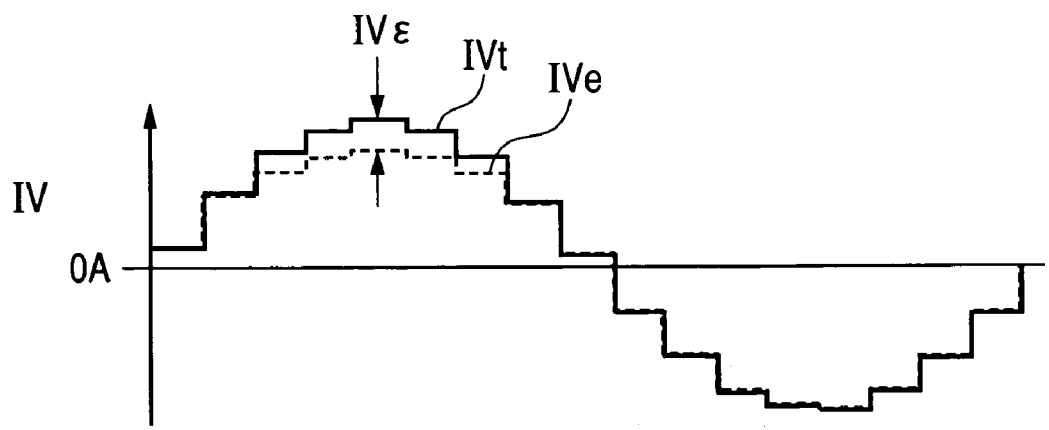

Normally, as shown in FIG. 4(C), V-phase motor current detection value IVs becomes the correct V-phase motor current IVt conforming to the actual current. The V-phase motor current detection value IVs can be used directly for control as the V-phase motor current value IV. However, if the motor output is increased, the on-duty of the PWM pulse VgH comes close to 100 percent (off-duty: 0 percent) and the pulse width of the shunt voltage waveform IVp comes close to 0 percent, then correct peak value cannot be gained due to the relay in the response of the noise filter and amplifier. It becomes the V-phase motor current value IVe including the error having caused the current detection error IVe, with the result that corrects detection of the motor current is made difficult. The U- and W-phase motor current values (IU and IW) are the same as the V-phase motor current value. To be more specific, the current detection accuracy is reduced if the voltage is so saturated that the on-duty on the high-side is 100 percent. This also deteriorates the torque control accuracy.

To solve this problem, the electric actuator of the present embodiment is designed in such a way that calculation is used to estimate the motor current value lying within the phase motor current detection values including an error. Referring to FIG. 5, the following describes the operation of the current correcting means 53 in a motor drive apparatus of the present embodiment:

FIG. 5 represents the operation of the current correcting means 53 of the present embodiment shown in FIG. 1. It shows the current detection values (waveforms) of various phases detected by three N-shunts 12, 13 and 14. What is shown here in the current detection value of an ideal system where the sample is broken down into detailed sections.

FIG. 5 (A) shows the case where the current detection error range is narrower than 120 degrees (electrical angle). It shows the current values (IUe, IVe and IWe) including the current detection error as shown by the solid line, in contrast to the motor current values (IUt, IVt and IWt) of various phases partly indicated by the broken line.

Paying attention to the V-phase, two sections within the one-period range can be mentioned as a result of classification; one section IVeB where the current detection error is large, and another section IVeS where current detection error is small (higher accuracy of the current detection precision capable of ignoring the current detection error). (This is also applicable to the cases of U- and V-phases). If the section where the current detection error of each of three phases is large is narrower than 120 degrees, then other two phases are in the section where the current detection error is small when one phase is in the section where the current detection error is laege. To be more specific, the V-phase motor current value IV of the section IVeB where the current detection error is large for the V-phase can be obtained by the calculation of IV=IU+IW. The same applies to other U- and V-phases.

The section where the current detection error is relatively large is determined by the phase where the voltage command value will be maximized, judging from the order of magnitude in the voltage command values of various phases (VU, VV and VW) (not illustrated). To be more specific, the on-duty of the high side FET of the phase where the voltage command value is the maximum is closest to 100 percent. Thus, it can be determined that the current detection error of the phase where the voltage command value is the maximum is relatively increased.

As described above, the detection error level of the current detector is grasped in advance. If the current detection error range is limited, the level is found out using the detection value of other current detector. This arrangement permits correction of the current detection value in the range where the detection error level is higher, and hence ensures adequate current control.

Figure 5A:
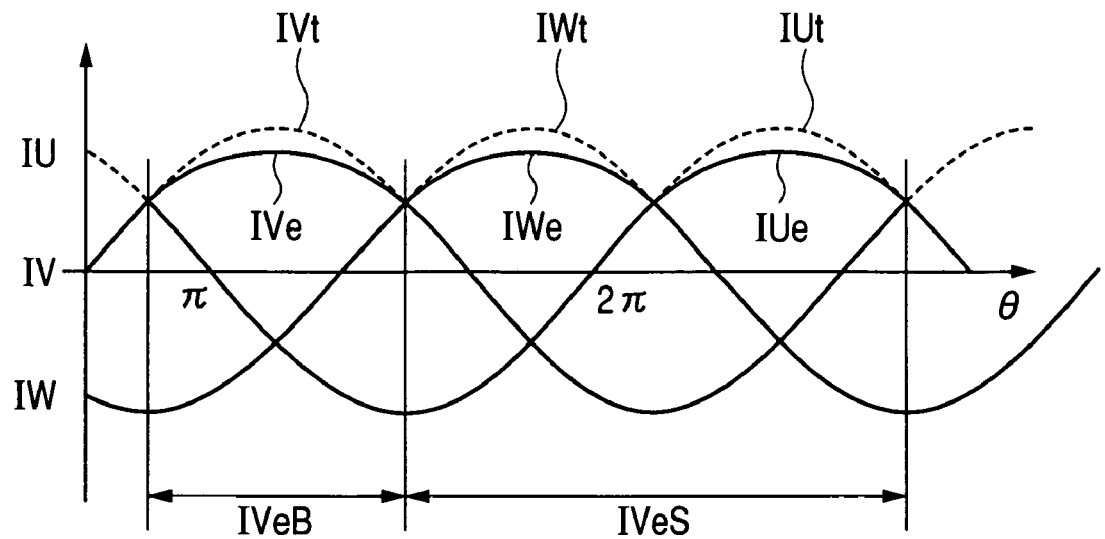
FIG. 5 is an explanatory diagram showing the method for calibrating the current detection value at the time of current detection failure in the motor drive apparatus as an embodiment of the present embodiment.
Figure 5B:
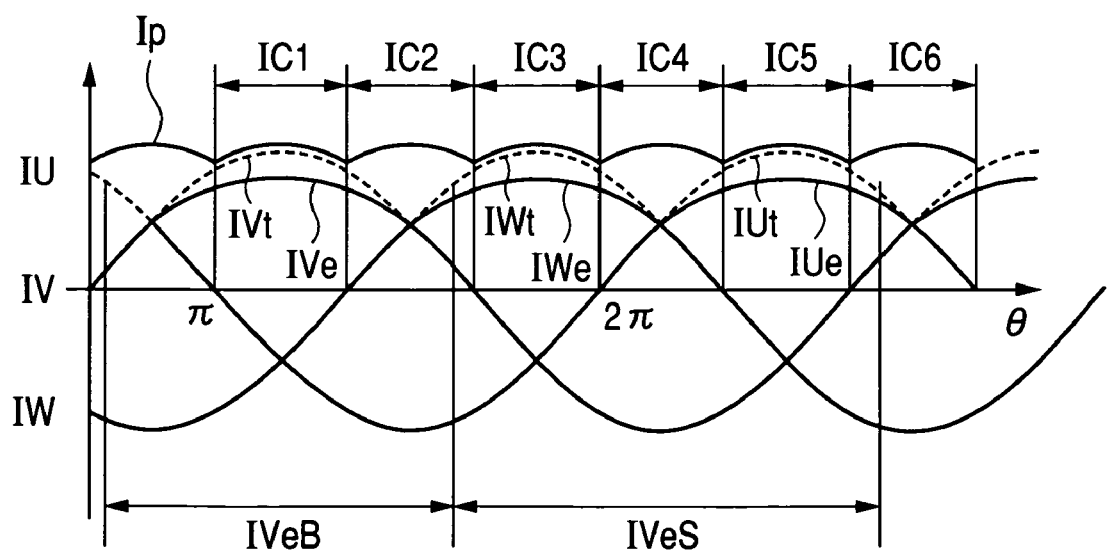

FIG. 5(B) shows the current detection value (waveform) of each phase using three N-shunts when the current detection error is greater than 120 degrees (in terms of electrical angle), and direct current value (waveform) of the P-shunt. It shows the current values (IUe, IVe and IWe) including the current detection error as shown by the solid line, in contrast to the correct motor current values (IUt, IVt and IWt) of each phase partly indicated by the broken line. It is assumed that the direct current value Ip of the P-shunt does not contain an error.

In FIG. 5(B), the section IVe where the current detection error is large in FIG. 5(A) is wider than 120 degrees, and is close to 180 degrees. In this case, two sections can be mentioned as a result of classification; one section where the accuracy of current detection values of two phases is higher and the current detection error of the current detection value of the one remaining phase is large (IC1, IC3 and IC4), and another section where the accuracy of the current detection value of one phase is high and the current detection error of the current detection value of the remaining two phases is large (IC2, IC4 and IC6).

For example, in the section IC1, the current detection error of the V-phase is large, and the U- and V-phase motor current values are negative. The accuracy of the V-phase current detection value by the N-shunt is high. In this case, the relationship between the direct current value Ip and the current value of each motor is expressed by $Ip=-(IU+IW)=IV$, and the motor current value of each of the three phases is obtained from said relationship.

In the meantime, in the section IC2, both V- and W-phase current detection errors are large. The accuracy of the current detection value of the U-phase alone is high. In this case, the relationship between the direct current value Ip and current value of each motor can be expressed by $Ip=-IU$. Thus, motor current values of the V- and W-phases cannot be determined. To solve this problem, on the assumption that the motor currents of the V- and W-phases are controlled by the current waveform (the current waveform is a sinusoidal wave in the case of applied voltage waveform of the sinusoidal wave) that can be estimated from the relationship among the applied current, the counter electromotive voltage of the motor and inductance, the motor current of each of the three phases is obtained from the calculation shown in Table 1, by distributing the U-phase motor current value IU (or direct current value Ip) into the V- and W-phase using the function expressing the shape of the waveform using the magnetic pole position (angle) $\theta$ of the rotor.

TABLE 1

| Section | IU | IV | IW |
| --- | --- | --- | --- |
| IC1 | IUt | $-$ (IU + IW) = Ip | IWt |
| IC3 | IUt | IVt | $-$ (IU + IV) = Ip |
| IC5 | $-$ (IV + IW) = Ip | IVt | IWt |
| IC2 | IUt = $-$Ip | Ip(1 + Tw / Tu) | Ip(1 + Tv / Tu) |
| IC4 | Ip(1 + Tw / Tv) | IVt = $-$ Ip | Ip(1 + Tu / Tv) |
| IC6 | Ip(1 + Tv /Tw) | Ip(1 + Tu / Tw) | IWt = $-$ Ip |

Tu = sin($\theta$)
Tv = sin($\theta - 2\pi / 3$)

Table 1 shows the arithmetic expression of the (angular) section when the current waveform in FIG. 5 (B) is a sinusoidal wave, and the motor current values (IU, IV and IW) of each phase. In the case of the sinusoidal wave, the motor current values (IU, IV and IW) of each phase can be obtained from Tu=sin($\theta$), Tv=sin($\theta-2\pi/3$), Tw=sin($\theta+2\pi/3$). Further, the arithmetic expression uses the motor current values (IU, IV and IW) wherein the accuracy of the detected current value is high. The prevent invention is not restricted to this arithmetic expression. It is also possible to employ the arithmetic expression that distributes into the motor current values of other two phases, using a formula representing the shape of the current waveform composed of the one-phase motor current value of high accuracy or direct current value Ip and rotor magnetic pole position $\theta$.

As described above, even when the angle range characterized by a big current detection error has exceeded 120 degrees and have come close to 180 degrees, it is possible, by using the magnetic pole position $\theta$ of the rotor, to obtain three-phase motor current values (IU, IV and IW) through the arithmetic operation, using the motor current detection values (IUt, IVt and IWt) characterized by a high current detection accuracy of each phase. This allows the motor to be driven without the torque control precision being deteriorated.

Referring to Table 2, the following describes the case wherein two current sensors have failed: Table 2 shows an arithmetic expression for current correction when two N-shunt current sensors are determined to have failed simultaneously in FIG. 5(B). The following describes an example where the U- and W-phase current sensors have failed:

TABLE 2

| Section | IU | IV | IW |
| --- | --- | --- | --- |
| IC1 | $-$ Ip(1 + Tw/Tv) | Ip | $-$ (IU + IV) |
| IC2 | $-$ Ip | Ip(1 + Tw / Tu) | $-$ (IU + IV) |
| IC3 | $-$ Ip $-$ IV | IVt | $-$ (IU + IV) |
| IC4 | Ip(1 + Tw / TV) | IVt(= $-$ Ip) | $-$ (IU + IV) |
| IC5 | Ip | IVt | $-$ (IU + IV) |
| IC6 | Ip $-$ IV | Ip(1 + Tu / Tw) | $-$ (IU + IV) |

The method for mathematical operation is the same as the one shown in Table 1. Basically, the formula expressing the shape of the current waveform composed of the direct current value Ip and magnetic pole position $\theta$ of the rotor is used for distribution to other two-phase motor current values. The arithmetic expression is applicable only to the motor current detection values (V-phase negative motor current value IVt) in the drawing) of high current detection accuracy. For example, the motor current detection value IVt detected by a V-phase current detector is directly applied to the V-phase motor current IV of the 60-degree sections (IC3, IC4 and IC5) in the section IVeS of high current detection accuracy. In other 60-degree sections (IC1, IC2 and IC6), the magnetic pole position $\theta$ of the rotor and direct current value Ip are used for mathematical operation. This is the only difference.

Further, when the current value detected by the V-phase current detector (the operation of the current detector of each of the U, V and W phases) appears problematic, mathematical operations can be performed using the magnetic pole position $\theta$ and direct current value Ip in all the 60-degree sections. To put it another way, it is possible to assume the V-phase motor current detection value IV=$-$Ip (1+Tu/Tw) in section IC3, IV=$-$Ip in section IC4, and IV=$-$Ip (1+Tw/Tu) in section IC5.

Referring to Table 3, the following describes the case when one current sensor is out of order. Table 3 shows an arithmetic expression for current correction when one N-shunt current sensor is determined to have been out of order in FIG. 5(B). It refers to the example of a faulty W-phase current sensor.

TABLE 3

| Section | IU | IV | IW |
| --- | --- | --- | --- |
| IC1 | IUt | Ip | $-$ (IU + IV) |
| IC2 | IUt = ($-$ Ip) | Ip(1 + Tw / Tu) | $-$ (IU + IV) |
| IC3 | IUt | IVt | $-$ (IU + IV) |
| IC4 | Ip( 1 + Tw / Tv) | IVt(= $-$ Ip) | $-$ (IU + IV) |
| IC5 | Ip | IVt | $-$ (IU + IV) |
| IC6 | Ip $-$ IV | Ip(1 + Tu / Tw) | $-$ (IU + IV) |

The method for mathematical operation is the same as the one shown in Table 1. For example, the motor current detection value IVt detected by the V-phase current detector is directly applies to the V-phase motor current IV in the 60-degree sections (IC3, IC4 and IC5) in the section IVeS where the current detection accuracy is high. In other 60-degree sections (IC2 and IC6), the magnetic pole position $\theta$ of the rotor (angle) and direct current value Ip are used for mathematical operation. The motor current detection value IUt detected by the U-phase current detector is directly applies to the U-phase motor current IU in the 60-degree sections (IC3, IC4 and IC5) in the section IUeS where the current detection accuracy is high. In the other 60-degree section (IC4), the magnetic pole position $\theta$ of the rotor (angle) and direct current value Ip are used for mathematical operation.

In the current correcting means 53, it is possible to make the following arrangements: If a detection error level has been detected to be within the range involving difficulties in detecting all the motor current values at the same time, the drive waveform is changed into the 120-degree rectangular wave by a waveform control means. The direct current detection value is directly used as motor current detection values for two-phase conduction, and a 120-degree conduction drive method is used, whereby the control procedure is simplified.

As described above, even if the current detection value contains an error, continuous torque control of the motor can be ensured without fail-stop, although absolute motor current detection precision deteriorates. In this case, the motor drive apparatus is in an abnormal (faulty) state, and the operator is informed by a display lamp, operation noise or motor torque fluctuation (motor vibration) that inspection and repair are necessary.

The values (including the values for trigonometric function) handled by the Tu, Tv and Tw can be implemented by reference to tables. Paying attention to the periodic function of 60-angle period, a periodic function table of 60-angle period having the magnetic pole position $\theta$ as the magnetic pole position $\theta$ is created in advance. The motor current of each of the U, V and W phases can be obtained easily by mathematical operation by referring to this table.

Referring to FIG. 5(B), the following describes the calibration (error evaluation) of the current detector of each N-shunt using the direct current value Ip of the P-shunt.

When power is turned on (initial stator after motor suspension), two-mode conduction mode is used in order to ensure that current will flow in the direction of +d axis of the d- and q-axes where the motor drive torque is minimized. For example, if the V-phase high-side FET and the W-phase low-side FET are turned on (not illustrated), then W-phase motor current detection value IWs and direct current detection value IPs can be detected, and several points is measured at a predetermined current value (or PWM pulse width).

If there is a relation of W-phase motor current detection value IWs=IPs at all the measured points, the W-phase current detector can be determined as normal. If IWs=a·IPs+b holds instead of IWs=IPs, correction can be made by obtaining the value for correcting the offset b and gain a.

Then power is turned on in the two-phase mode (V-phase low-side FET is on and W-phase low-side FET is on) so that the great amount of current will flow in the direction of –d axis. The V-phase motor current detection value IVs and direct current IPs are detected, and several points is measured at a predetermined current value (or PWM pulse width).

If there is a relation of V-phase motor current detection value IVs=IPs at all the measured points, the V-phase current detector can be determined as normal. If IVs=a IPs+b holds instead of IVs=IPs, correction can be made by obtaining the value for correcting the offset b and gain a.

If IWs≠IPs=IVs, the W-phase current detector can be determined as faulty. If IWs≠IPs≠IVs, it is possible to check if the U-phase current detector is faulty or not. A two-phase conduction pattern is selected where the rotational angle of the motor is minimized and U-phase motor current detection value IUs can be detected, and electric conduction is checked. In this case, the motor rotates a maximum of 60 angles in terms of electrical angle. Priority is placed on the calibration of the current detector. If there are many pole pairs of the motor, it is intended to minimize the adverse effect of rotation, since the mechanical angle is 60 degrees per number of the pole pairs.

The aforementioned predetermined current value (or PWM pulse width) is 30%, 50% and 80% with reference to the current value of the motor. These values are obtained in advance from the motor winding resistance and impedance so as to maximize the current value without causing the motor rotation and vibration to raise any problem. If the detected current value is far above or below the assumed level, the motor failure (ground-fault of the winding) or inverter circuit failure (device breakdown) can be estimated. Accordingly, the PWM setting is corrected and the current detector is calibrated to ensure that the current is kept within the tolerance of the device.

The following describes another calibration method: This method is to calibrate the current detector at the period of 60 degrees where the one-phase motor current becomes zero during the motor rotation. For example, when the electrical angle is 180 degrees ($\pi$[rad]), IPs=IVs=–IWs is anticipated. As described above with reference to FIGS. 5(A) and (B), it is highly probable that the V-phase motor current detection value IVs is the motor current detection value IVe including an error. Accordingly, the magnitude of the error as the detection error IV$\epsilon$=IPs–IVs can be detected and the W-phase motor current detection value IWs can be directly used as an calibration value. The calculation method is an item to be learnt at each rotational period.

Another calibration method is to calibrate the current detector at 60-degree period wherein the one-phase motor current becomes a peak value during motor rotation other two-phase motor currents is reduced to one half. For example, when the electrical angle is 210 degrees ($\pi$7/6 [rad]), IPs=IVs=–½ IWs=–½ IUs is anticipated. Since it is highly probable that the V-phase motor current detection value IVs contains an error, the magnitude of the error can be detected, and the U-phase motor current detection value IUs and the W-phase motor current detection value IWs can be directly used as calibration values.

If the aforementioned relationship of equality sign has broken up at two timed calibration intervals during motor rotation, evaluation can be made to determine that the current detector is faulty. When the aforementioned relationship of equality sign is kept, evaluation can be made to determine that the motor is faulty (ground-fault of the winding) or inverter circuit is faulty (device breakdown).

As described above, the detection error of the current detector and the error of the current detector can be detected at 60-degree period intervals during motor rotation. Current detection value can be corrected according to the detection error level of the current detector. Further, when the correction involves some difficulties, the motor current value can be estimated by mathematical operation and the estimated value of the motor current can be used as an alternative. This arrangement ensures continuous current control.

To put it another way, continued adequate current control is provided in conformity to the error level of the current detector. This arrangement minimizes the reduction of output and ensures stable torque control up to the high speed drive and high torque area.

In the aforementioned description, in order to use the direct current detection value by the current correcting means 53, the direct current detection resolution is preferred to be equal to or better than the motor current detection resolution. Further, the direct current detection method (timing) is to hold the peal value of the direct current within the PPWM period as a direct current instantaneous value (sample holding), and to turn it into a direct current value, whereby the direct current value (as an instantaneous value of the direct current) and motor current value can be compared, and the detection error level including the gain and offset can be detected. This method is preferably utilized.

As described above, in the electric actuator of the present embodiment, a mathematical operation is used to estimate the motor current value within the range of the motor current detection value of each phase (range where detection is difficult) including an error. At the same time, the drive waveform is changed from a sinusoidal wave to a rectangular wave in conformity to the current detection error (magnitude of detection error level) so as to avoid voltage saturation, and PWM modulation is carried out. While the motor applied voltage waveform (with on-duty restricted) is controlled, a higher motor output is provided. This arrangement allows the motor to be driven without reducing the torque control precision. Further, the width of the PWM pulse is equivalently reduced by the amount corresponding to the improvement of the voltage utilization rate. This extends the range where current can be detected. To be more specific, mathematical operation is used to estimate the motor current value in the range where motor current detection involves difficulties, and the motor current value is covered. This arrangement ensures adequate current control. If the motor current detection error is increased, the drive waveform is changed from sinusoidal wave to rectangular wave according to the detection error level outputted in conformity to the magnitude of the detection error. Then PWM modulation is carried out, and motor applied voltage waveform is controlled. In this manner, the motor current detection error is minimized. Thus, even if there is any range where correct detection of the motor current cannot be performed, this arrangement minimizes the reduction in torque control precision, and ensures stable torque control up to the high speed drive and high torque area.

Figure 6:
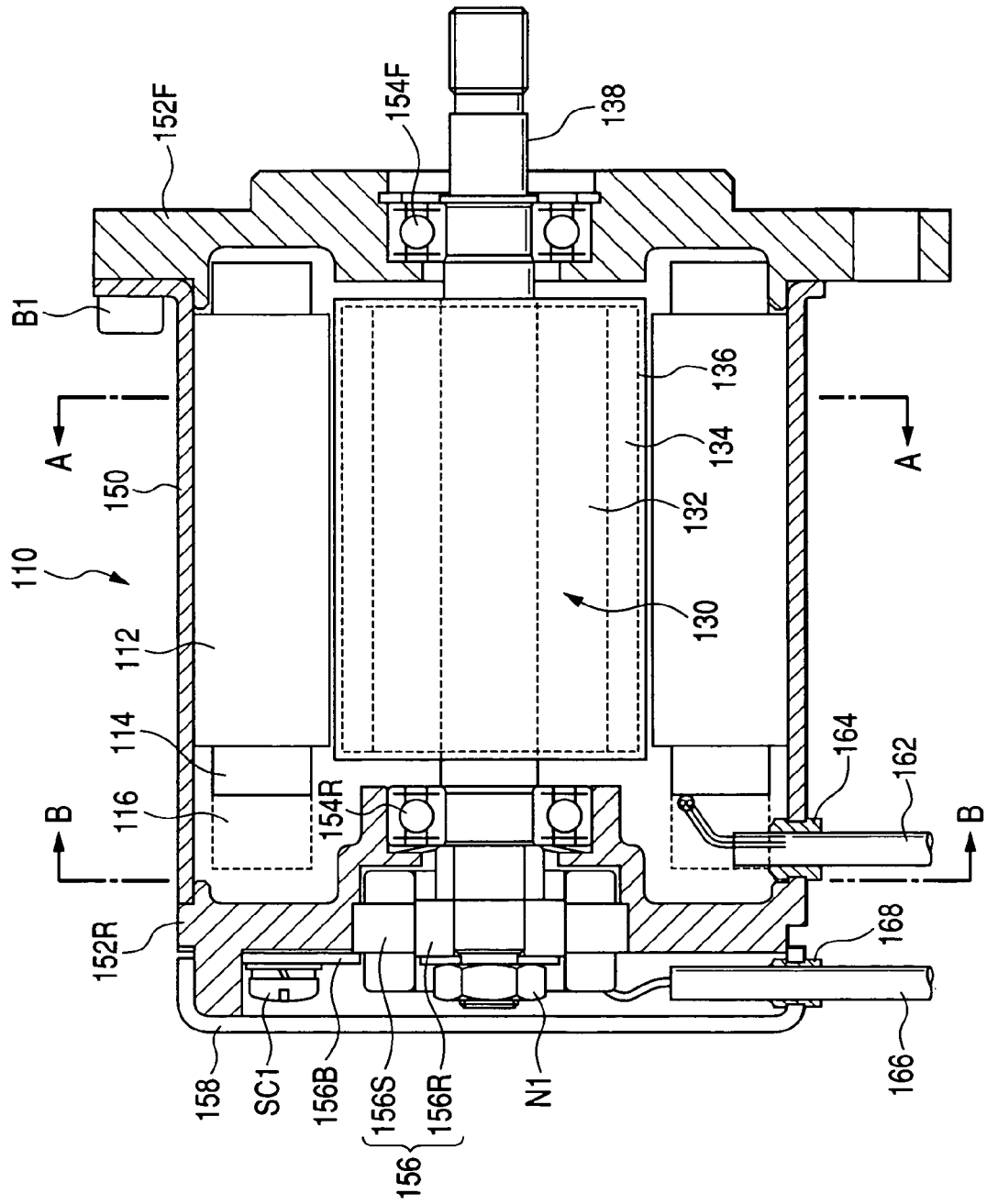
FIG. 6 is a transverse cross sectional view representing the configuration of the motor drive apparatus as an embodiment of the present invention.
Figure 7:
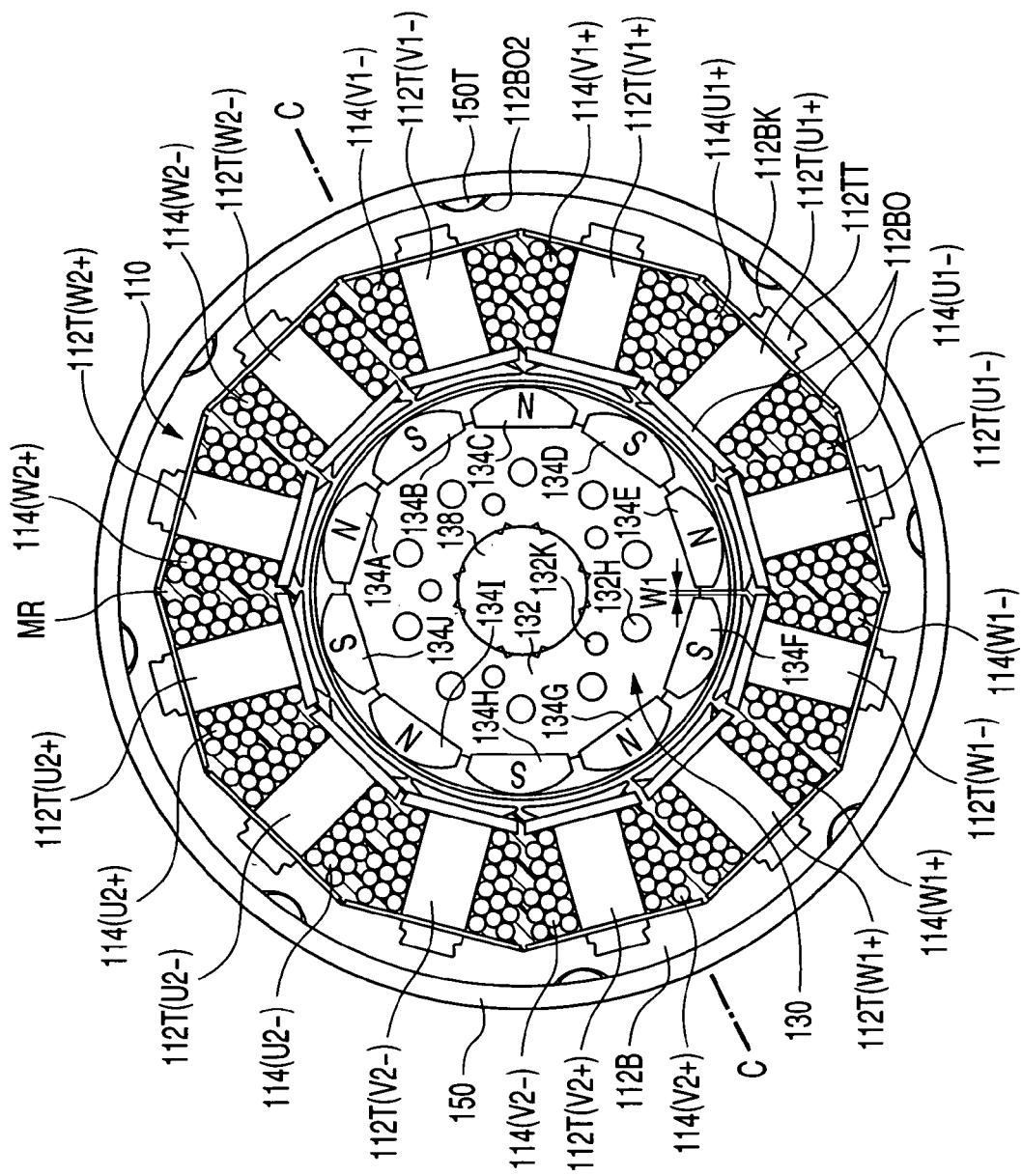
FIG. 7 is a cross sectional view taken along line A—A of FIG. 6.

Referring to FIGS. 6 and 7, the following describes the configuration of the motor 100 used in the motor drive apparatus of the present embodiment:

FIG. 6 is a transverse cross sectional view representing the configuration of the motor drive apparatus as an embodiment of the present invention. FIG. 7 is a cross sectional view taken along line A—A of FIG. 6.

The motor 100 is a surface magnet type synchronous motor comprising a stator 110 and the rotor 130 rotatably supported inside this stator 110. The EPS motor 100 is driven by the battery mounted on the vehicle, namely, by power supplied from a 14-volt power source (12-volt power source), a 42-volt power source (36-volt power source) or a 48-volt power source, for example.

The stator 110 comprises a stator core 112 formed of a magnetic substance laminated with a silicon steel plate and a stator coil 114 held inside the slot of the stator core 112. The stator core 112 is composed of an annular back core and a plurality of teeth created separately from this back core and mechanically fixed onto the back core thereafter, as will be described later with reference to FIG. 2. Each of the teeth is wound with a stator coil 114. The stator coil 114 is wound by a distributed or concentrated winding method.

The stator coil 114 subjected to distributed winding is characterized by excellent field weakening control and occurrence of reluctance torque. Downsizing of the motor and reduction of winding resistance are very important for the electric power steering motor. The length of the coil end of the stator coil 114 can be reduced by concentrated winding of the stator coil 114. This arrangement reduces the length of the EPS motor 100 in the direction of rotary axis. Further, since the length of the end of the stator coil 114 can be reduced, the resistance of the stator coil 114 can be reduced, and rise in motor temperature can also be reduced. Reduction in coil resistance minimizes the motor copper loss. Thus, the percentage of the energy consumed by copper loss relative to the entire energy inputted into the motor can be reduced and the efficiency of the output torque relative to input energy can be improved.

As described above, the electric power steering motor is driven by the power source mounted on a vehicle. The output voltage of the aforementioned power source is often low. A series circuit is equivalently formed by the switching device with an inverter formed across the power source terminal, the aforementioned motor and other current supply circuit connecting means. In the aforementioned circuit, a total of the terminal voltage of the circuit constituent devices becomes the terminal voltage of the aforementioned power source. Thus, the terminal voltage of the motor for supplying power to the motor is lowered. To ensure the current flowing into the motor under this condition, it is crucial to keep the copper loss of the motor low. For this reason, a low-voltage system of 50 volts or more is often used as the power source mounted on a vehicle. The concentrated winding method is preferably applied to the stator coil 114. This is very important especially when a 12-volt power source is used.

The power steering motor is placed close to the steering column or close to a rack-and-pinion mechanism. Downsizing is required in either case. In the downsized structure, the stator winding must be fixed in position. It is also important to make winding work easy. Concentrated winding ensures easier winding work and fixing work than distributed winding.

The end of the stator coil 114 is molded. The power steering motor preferably keeps the torque fluctuation such as cogging torque to a very low level. After the stator section has been assembled, machining may be performed again inside the stator. Chips will be produced by such machining operation. Means must be provided to prevent these chips from entering the end of the stator coil. The coil end is preferably molded.

The stator coil 114 is composed of three phases; U, V and W. Each of them is composed of a plurality of coils. These coils are connected by the connection ring 116 provided on the left of the drawing for each of three phases.

The electric power steering motor is required to provide a large torque. For example, when the vehicle is stopped or is running close to the stopped state, if the steering wheel is turned at a high speed, the aforementioned motor is required to provide a large torque due to the friction coefficient between the steered wheel and ground surface. In this case, a large current is supplied to the stator coil. This current can be 50 amperes or more, although it depends on conditions. Further, it can be 70 or 150 amperes. To ensure safe supply of such a large current and reduce generation of heat by the aforementioned current, it is important to use the connection ring 116. Current is supplied to the stator coil through the connection ring 116, whereby the connection resistance is lowered and voltage drop resulting from copper loss is minimized. This arrangement provides easy supply of a large current and reduces the time constant for current startup caused by the operation of the inverter device.

The stator core 112 and stator coil 114 are molded by resin together to form an integral piece, and constitutes a stator subassembly. This integral stator subassembly is press-fitted into the cylindrical yoke 150 formed of metal such as aluminum and is fixed therein. The power steering motor mounted on a vehicle is subjected to various forms of vibration, as well as the impact from the wheel. Further, it is used under the condition of a drastic temperature change. It may be exposed to the temperature of 40 degrees Celsius below zero, or 100 degrees Celsius or more. Further, means must be taken to prevent water from entering the motor. In order for the stator to be fixed to the yoke 150 under these conditions, the stator subassembly is preferably press-fitted into a cylindrical metal free of any hole such as a screw hole, on the outer periphery of at least the stator core of the cylindrical yoke. After pressing fitting, screws may be used to fix it in position, from the outer periphery of the yoke. In addition to press fitting, locking is preferably provided.

The rotor 130 comprises a rotor core 132 formed of a magnetic substance laminated with a silicon steel plate; magnets 134 as a plurality of permanent magnets bonded on the surface of the rotor core 132 by adhesive; and a magnet cover 136 composed of non-magnetic substance provided on the outer periphery of the magnets 134. The magnet 134 is a rare-earth magnet and is composed of neodymium. The rotor core 132 is fixed on the shaft 138. A plurality of magnets 134 is bonded on the surface of the rotor core 132 by adhesive. At the same time, the outer periphery is covered with a magnet cover 136, whereby the magnet 134 is prevented from being thrown away. The aforementioned magnet cover 136 is made stainless steel (commonly known as SUS). It can be wound with tape. Use of the stainless steel provides easier production. As described above, the power steering motor is suited to hold the permanent magnet that is subjected to severe vibration and thermal change, and is easy to break down. Even if it breaks down, it is prevented from being thrown away, as described above.

A front flange 152F is arranged on one end of the cylindrical yoke 150. The yoke 150 and front flange 152F are fixed together by a bolt B1. A rear flange 152R is press-fit into the on the end of the yoke 150. A bearing 154F and a bearing 154R are mounted on the front flange 152F and rear flange 152R, respectively. A shaft 138 and a stator 110 fixed on this shaft 138 are rotatably supported by these bearings 154F and 154R.

A resolver (sensor) rotor 156R is fixed onto one end of the shaft 138 (left end in the drawing) by a nut N1. A resolver stator 156S is mounted on the rear flange 152R. The resolver stator 156S is mounted in position by the resolver holding plate 156B secured onto the reference flange 156R by a screw SC1. The resolver-156 is composed of the resolver stator 156S and resolver rotor 156R. The rotation of the resolver rotor 156R detected by the resolver stator 156S, whereby the positions of a plurality of magnets 134 can be detected. A rear holder 158 is mounted on the outer periphery of the rear flange 152R so as to cover the resolver 156.

Power is supplied from an external battery to each of the U, V and W phases through a power cable 162. The power cable 162 is mounted on the yoke 150 by a grommet 164. The magnetic pole position signal detected from the resolver stator 156S is taken out by the signal cable 166. The signal cable 166 is mounted on the rear holder 158 by the grommet 168.

Referring to FIG. 7, the following describes the details of the configuration of the stator 110 and rotor 130:

FIG. 7 is a view in the direction of the arrow A—A in FIG. 6. The same reference numerals as those in FIG. 6 indicate corresponding parts.

The stator 110 will be described first. The stator core 112 shown in FIG. 6 is composed of an annular back core 112B and a plurality of teeth 112T provided separately from this annular back core 112B. The annular back core 112B is made of a lamination of magnetic sheet metals such as SUS stamped out by press molding.

In the present embodiment, the teeth 112T are composed of twelve independent teeth 112T (U1+), 112T (U1−), 112T (U2+), 112T (U2−), 112T (V1+), 112T (V1−), 112T (V2+), 112T (V2−), 112T (W1+), 112T (W1−), 112T (W2+), and 112T (W2−). The teeth 112T (U1+), 112T (U1−), 112T (U2+), 112T (U2−), 112T (V1+), 112T (V1−), 112T (V2+), 112T (V2−), 112T (W1+), 112T (W1−), 112T (W2+), and 112T (W2−) are wound with stator coils 114 (U1+), 114 (U1−), 114 (U2+), 114 (U2−), 114 (V1+), 114 (V1−), 114 (V2+), 114 (V2−), 114 (W1+), 114 (W1−), 114 (W2+), and 114 (W2−), respectively in a concentrated winding mode.

Here the stator coil 114 (U1+) and the stator coil 114 (U1−) are wound in such a way that current flows in the opposite directions. The stator coil 114 (U2+) and the stator coil 114 (U2−) are also wound in such a way that current flows in the opposite directions. The stator coil 114 (U1+) and the stator coil 114 (U2+) are wound in such a way that current flows in the opposite directions. Further, the stator coil 114 (U1−) and the stator coil 114 (U2−) are also wound in such a way that current flows in the opposite directions. The relation of the directions of current flow for the stator coil 114 (V1+), stator coil 114 (V1−), stator coil 114 (V2+) and stator coil 114 (V2−), and the relation of the directions of current flow for the stator coil 114 (W1+), stator coil 114 (W1−), stator coil 114 (W2+) and stator coil 114 (W2−) are also the same as those in the case of U phases.

Twelve teeth 112T and stator coils 114 are manufactured in the same manner. The tooth 112T (U1+) and stator coil 114 (U1+) will be taken as an example to explain the assembling process. The stator coil 114 (U1+) is a molded coil formed in such a way as to wind the tooth 112T (U1+). The stator coil 114 (U1+) as the molded coil is molded together with a bobbin 112BO. An integrated piece consisting of the stator coil 114 (U1+) and bobbin 112BO is fitted into the tooth 112T (U1+) from its rear. The tip end of the tooth 112T (U1+), namely, the side facing the rotor 130 is expanded in the circumferential direction. The bobbin 112BO and stator coil 114 (U1+) serve as stoppers in this expanded section, and are anchored therein. A concave portion 112TT shaped to make a tight fit with a convex portion 112BK formed on the inner periphery of the back core 112B is formed on the rear of the tooth 112T (U1+). The concave portion 112TT of the tooth 112T (U1+) wound with the molded stator coil 114 (U1+) is press-fitted into the convex portion 112BK of the back core 112B so that the tooth 112T (U1+) is fastened on the back core 112B. The above description applies also to the process of mounting the stator coil 114 (U1+) stator coil 114 (W2−) on the other teeth 112T (U1+) through 112T (W2−), and the process of mounting the other teeth 112T (U1−) through 112T (W2−) on the back core 112B.

Twelve stator coils 114 and teeth 112T fastened on the back core 112B are integrally-molded by the thermosetting resin MR, and are molded into a stator subassembly. The side, facing the rotor 130, as the inner peripheral surface of the molded stator subassembly, namely, as the tip ends of the teeth 112T (U1−) through 112T (W2−) is machined to improve the roundness of the inner diameter, whereby the gap variation between the stator 110 and rotor 130 is reduced. Further, as compared with the case where molding is not performed, integral molding process improves the shrink mark resulting from the heat generated by electric conduction of the stator coil 114. Further, the molding process protects the stator coil and teeth against vibration.

For example, when the gap between the outer periphery of the rotor core of the rotor 130 and the inner periphery of the teeth of the stator 110 is 3 mm (3000 μm), the roundness of the inner diameter of about ±30 μm will occur due to the production error of the back core 112B and teeth 112T, and assembling error of the back core 112B and teeth 112T at the time of press fitting and assembling. The roundness is equivalent to 1% (=30 μm/3000 μm) of the gap, and therefore a cogging torque is produced by the roundness of inner diameter. However, after molding, the inner diameter is machined. This process reduces the cogging torque resulting from the roundness of the inner diameter. Reduction of the cogging torque improves the steering comfort.

The stator subassembly as the integral mold is press-fitted into the yoke 150 and are secured in position. In this case, a plurality of concave portions 150T are formed inside the yoke 150. Further, a plurality of concave portions 112BO2 are formed on the outer periphery of the back core 112B. Their engagement prevents the back core 112B from rotating in the circumferential direction of the yoke 150.

The stator coil 114 (U1+) and stator coil 114 (U1−), and stator coil 114 (U2+) and stator coil 114 (U2−) are positioned symmetrically, relative to the center of the stator 110. To be more specific, the stator coil 114 (U1+) and stator coil 114 (U1−) are located adjacent to each other, and the stator coil 114 (U2+) and stator coil 114 (U2−) are also located adjacent to each other. Further, the stator coil 114 (U1+) and stator coil 114 (U1−), and stator coil 114 (U2+) and stator coil 114 (U2−) are positioned symmetrically with respect to a line, relative to the center of the stator 110. To put it another way, the stator coil 114 (U1+) and stator coil 114 (U2+) are placed symmetrically with respect to a line, relative to the broken line C—C passing through the shaft 138. Further, the stator coil 114 (U1−) and stator coil 114 (U2−) are placed symmetrically.

Similarly, the stator coil 114 (V1+) and stator coil 114 (V1−), and stator coil 114 (V2+) and stator coil 114 (V2−) are positioned symmetrically with respect to a line. The stator coil 114 (W1+) and stator coil 114 (W1−), and stator coil 114 (W2+) and stator coil 114 (W2−) are also positioned symmetrically with respect to a line.

Further, one stator coils 114 are continuously wound in the form of one wire; namely, the stator coil 114 (U1+) and stator coil 114 (U1−) form one wire, which constitutes two winding coils. They are each inserted into the teeth, and are wound on the teeth. Similarly, the stator coil 114 (U2+) and stator coil 114 (U2−) are continuously wound in the form of one wire. Similarly, the stator coil 114 (V1+) and stator coil 114 (V1−); stator coil 114 (V2+) and stator coil 114 (V2−); the stator coil 114 (W1+) and stator coil 114 (W1−); and stator coil 114 (W2+) and stator coil 114 (W2−) are continuously wound in the form of one wire, respectively.

Such a symmetric layout with respect to a line and winding of two adjacent coils of the same phase in the form of one wire provide a simplified connection link structure, when the same or difference phases are connected by the connection link.

The following describes the configuration of the rotor 130. The rotor 130 comprises:

a rotor core 132 composed of a magnetic substance;

ten magnets 134 (134A, 134B, 134C, 134D, 134E, 134F, 134G, 134H, 134I and 134J) bonded on the surface of the rotor core 132 by adhesive; and a magnet cover 136 arranged on the outer periphery of the magnets 134. The rotor core 132 is secured on the shaft 138.

When the surface (side opposite to the teeth 112T of the stator) is an N-pole, the magnets 134 are energized in the radial direction to ensure that the back side thereof (side bonded to the rotor core 132) will be an S-pole. Further, when the surface (side opposite to the teeth 112T of the stator) is an S-pole, the magnets 134 are energized in the radial direction in some cases to ensure that the back side thereof (side bonded to the rotor core 132) will be an N-pole. The adjacent magnets 134 are energized in such a way that the energized poles will alternate with each other in the circumferential direction. For example, if the surface of the magnet 134A is attracted by the N-pole, the surfaces of the adjacent magnets 134B and 134J are attracted by the S-pole.

To put it another way, when the surfaces of the magnets 134A, 134C, 134E, 134G and 134I are attracted by the N-pole, the magnets 134B, 134D, 134F, 134H and 134J are attracted by the S-pole.

The magnets 134 have a semicylindrical cross section. The semicylindrical shape can be defined as a structure wherein the radial thickness of the right and left in the radial direction is smaller than that at the center in the circumferential direction. Such a semicylindrical structure allows the magnetic flux to be distributed in the form of a sinusoidal wave. Then the induced voltage waveform resulting from addition of the sinusoidal wave voltage can be changed into a sinusoidal wave. and the amount corresponding to pulsation can be reduced. Reduction in the amount corresponding to pulsation improves the steering comfort. When a magnet is formed by attraction to the ring-like magnetic substance, By control of the energizing force, the magnetic flux can be distributed in the form similar to the sinusoidal wave, in some cases.

The rotor core 132 is provided with ten large-diameter through-holes 132H formed on the concentric circle and five small-diameter recesses 132K with protruded inner periphery. The rotor core 132 is composed of a lamination of the sheet metal of magnetic substance such as SUS having been stamped out by press molding. The recesses 132K are formed by crimping the sheet metal at the time of press molding. When a plurality of sheet metals are laminated, the recesses 132K are fitted with each other, whereby positioning is performed. The through-hole 132H is intended to cut down the inertia. The rotor balance can be improved by the through-hole 132H. The outer periphery of the magnet 134 is covered by the magnet cover 136 to prevent the magnet 134 from being thrown away. The back core 112B and rotor core 132 can be formed simultaneously from the same sheet metal by stamping out by a press.

As described above, the rotor 130 of the present embodiment has ten magnets 134 and ten poles. Also as described above, twelve teeth 112T are provided. The number of slots formed between adjacent teeth is 12. To put it another way, the EPS motor of the present invention is a 10-pole 12-slot surface magnetic type synchronous motor. Further, without being restricted to the 10-pole 12-slot motor, a 8-pole 9-slot motor or 10-pole 9-slot motor can also be used.

Figure 8:
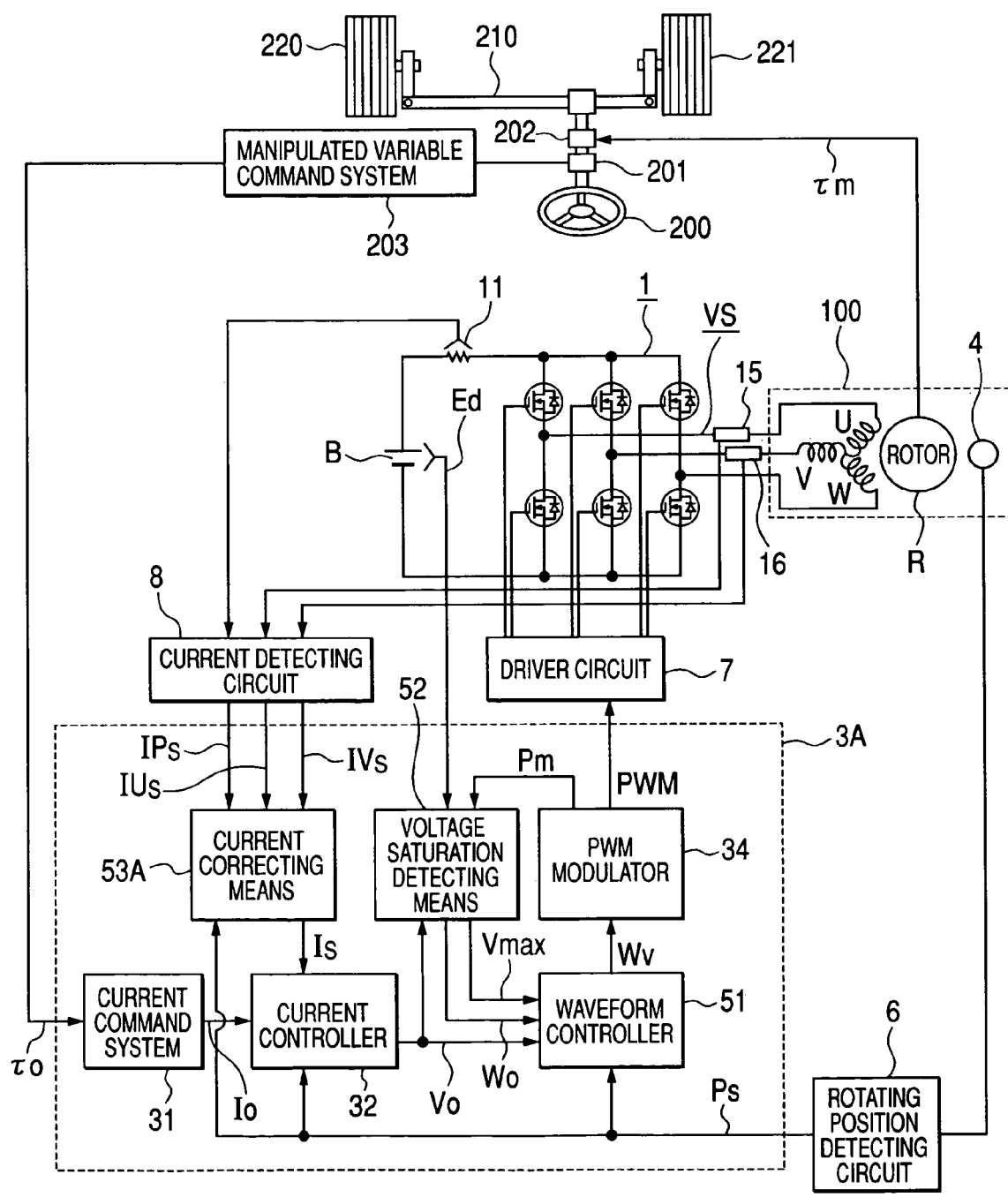
FIG. 8 is a block diagram representing the electric power steering apparatus wherein the motor drive apparatus of as an embodiment of the present embodiment as is used as an electric actuator.

Referring to FIG. 8, the following describes the configuration of the electric power steering apparatus wherein the electric actuator is formed using the motor drive apparatus as another embodiment of the present invention.

FIG. 8 is a block diagram representing the electric power steering apparatus wherein the motor drive apparatus of as an embodiment of the present embodiment as is used as an electric actuator. In this case, the same reference numerals as those in FIG. 1 indicate corresponding parts.

The difference with the embodiment shown in FIG. 1 is that the motor current detectors 15 and 16 are arranged so as to detect the current flowing to the U- and V-phase output lines (armature windings U and V of the brushless d.c. motor 100) of the inverter circuit 1, and the W-phase motor current value is obtained through mathematical operation by a current correcting means 54, using the detected U- and V-phase motor current values. In the controller 3A, the current correcting means 53A is used to correct the current, similarly to the case of the current correcting means 53. The motor current detection values IUs and IVs and direct current detection value IPs are compared according to the motor current detection values IUs and IVS and direct current detection value IPs detected by the current detecting circuit 5, and the angular position Ps detected by the rotating position detecting circuit 6. The result is detected as the detection error level of a plurality of current detectors. The motor current detection values IUs, IVs and IWs are corrected in conformity to the detection error level. Then the motor current value Ip (IU, IV and IW) after correction are outputted.

The current detectors 15 and 16 are mounted on the armature windings U and V of the brushless d.c. motor 100. They can be mounted for any two of the armature windings U, V and W. Preferably, a current detector is preferably installed for each of the three phases. Then the current correcting means 53A finds out a third motor current value (IW) through mathematical operation, using the detected motor current values (IU, IV and IW) of the two phases. Such a configuration reduces the number of parts and production costs.

In the present embodiment, despite the presence of two current detectors, continuous detection of motor current is provided (switching is carried out by the inverter circuit 1 but the current flows continuously due to the motor inductance). This arrangement ensures stable detection of current in the section of 360 degrees in terms of electrical angle. If one of the current detectors, for example, the U-phase current detector is faulty, this corresponds to the case where two of the current detectors are faulty in the structure using three N-shunts shown in FIG. 1 (Table 2). However, the V-phase motor current detection value IVs allows the V-phase motor current detection value IVt to be correctly detected at all times in the section of 360 degrees in terms of electrical angle. As compared with Table 2, expression IV=IVt can be employed in the sections IC1, IC2 and IC6. In this case, if the V-phase current detector is also faulty, mathematical operation can be used in the same manner as in the configuration shown in FIG. 1. Further, in the process of checking a failure of the current detector, the failure can also be checked by using the same algorithm as that in the configuration of FIG. 1. However, the detection error IVe need not be taken into account during the rotation of the motor.

As described above, the present embodiment, allows a high current detection precision to be maintained without depending on the magnitude of the motor output. Excellent torque control performance can be sustained. Thus, the present embodiment ensures superb responsivity (maneuverability) of the electric power steering apparatus to be maintained.

Figure 9:
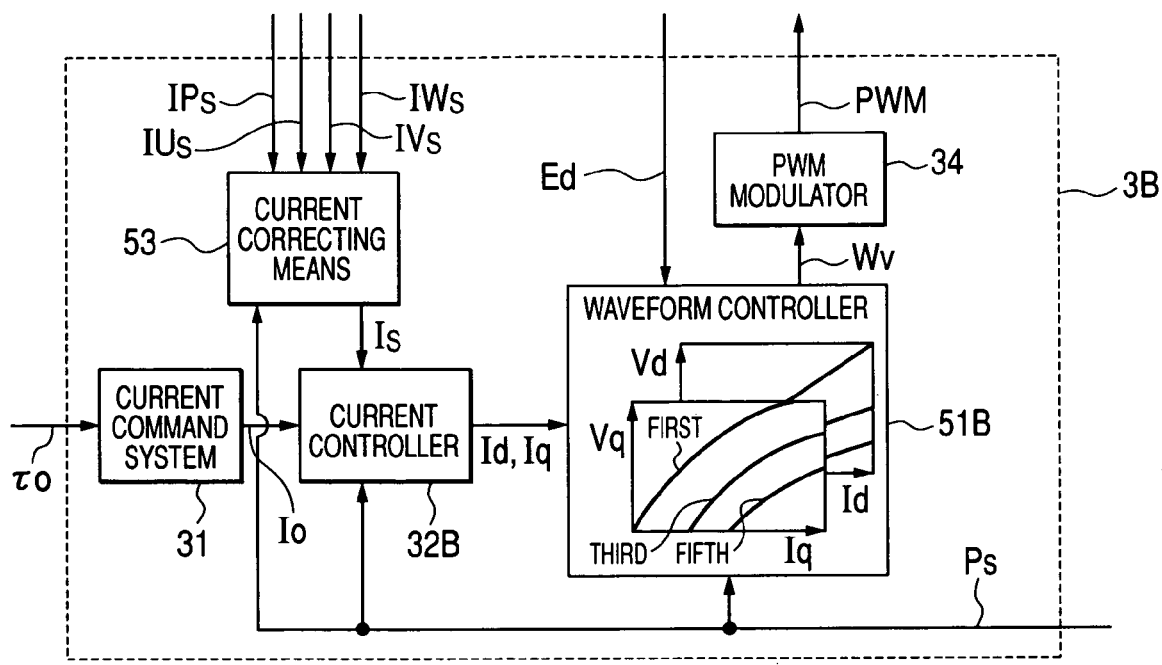
FIG. 9 is a block diagram representing the configuration of the controller of the motor drive apparatus according to another embodiment of the present invention.
Figure 10:
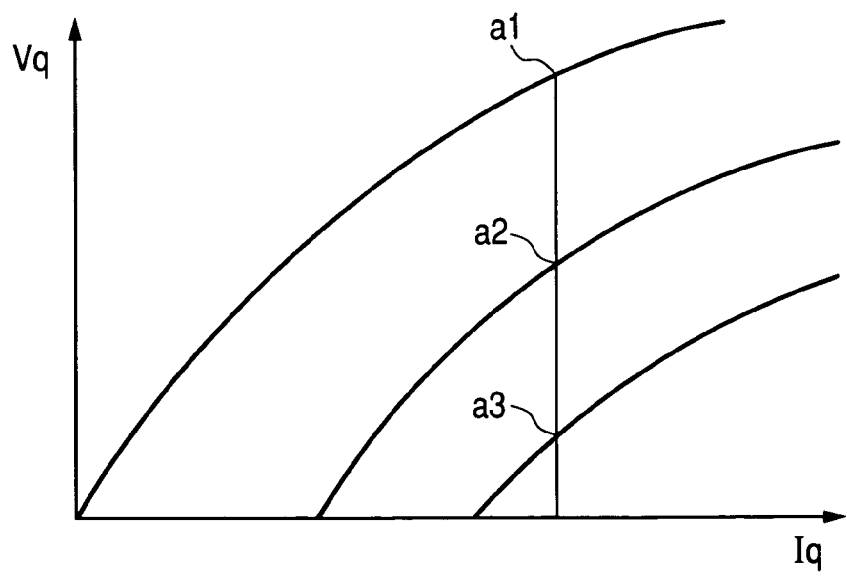
FIG. 10 is an explanatory diagram describing the operation of a waveform control means used in the controller of the motor drive apparatus according to anther embodiment of the present invention.

Referring to FIGS. 9 and 10, the following describes the configuration of the controller 3B of the motor drive apparatus according to another embodiment of the present invention. The same configuration as that of FIG. 1 is used for the electric power steering apparatus, wherein the motor drive apparatus equipped with the controller according to the present embodiment is used as an electric actuator.

FIG. 9 is a block diagram representing the configuration of the controller of the motor drive apparatus according to another embodiment of the present invention. FIG. 10 is an explanatory diagram describing the operation of a waveform control means used in the controller of the motor drive apparatus according to anther embodiment of the present invention. The same reference numerals as those in FIG. 1 indicate corresponding parts.

The difference of the present embodiment from FIG. 1 is found in the current controller 32B and the waveform controller 51B. The current controller 32B is the same as the current controller 32 of FIG. 1. However, the output signal is not the voltage commands (Vod, Voq), but the current values (Id, Iq). The output of the current controller 32B is inputted into the waveform controller 51B.

The waveform controller 51B is equipped with a current command-voltage command conversion function. The degree of voltage saturation is contained in the current command-voltage command conversion function as a coefficient of the power voltage Ed in advance. The waveform controller 51B converts the current values (Id, Iq) into the voltage command (Vod, Voq) through the current command-voltage command conversion function. It converts the d-q axes (2 phases) into U, V and W (three phases) to output the PWM modulated wave Wv. The current command-voltage command conversion function has a function on each of the d-axis and q-axis. The fundamental wave components and odd-numbered harmonic components (where the magnitude of each component is Vd, Vq) is assumed as the parameter of the applied voltage waveform, and the rotor magnetic pole position θ (angular position Ps) is employed to generate the instantaneous command of the voltage commands (Vod, Voq).

Referring to FIG. 10, the following describes how to find the q-axis voltage command Vq. The q-axis voltage command Vq is obtained from the q-axis voltage command Vq (1), Vq (3) and vq (5) according to the following equation:

$$Vq=(a1\ Vq(1)+a2Vq(2)+a3Vq(3))\times(Ed/12) \qquad (1)$$

Here the q-axis voltage command Vq (n) (n=1, 3, 5) of each order is obtained as Vq (n)=Iq×Rm from the motor resistance Rm and the q-axis current Iq inputted from the current controller 32B. The coefficients a1, a2 and a3 denote the coefficients shown in FIG. 10, and are given as a function for currents Iq. In this manner, the waveform can be controlled in response to the degree of voltage saturation by changing the ratio of superimposing the odd-numbered high-order harmonic in response to current Iq, and by multiplying the ratio (Ed/12) of the voltage Ed of the battery B relative to the standard battery voltage (12 volts in this case).

The current command-voltage command conversion function involves no problem as a mathematical operation formula. It is possible to put the d-axis function and the q-axis function to common use for simplification, and to obtain the voltage command Vod from the ratio of the magnitude between the current values Id and Iq and the voltage command Voq. Further, the current command-voltage command conversion function in the d-q axis is illustrated, but it is also possible to use a conversion function for controlling the applied voltage waveform, subsequent to conversion from the d-q axis (two phases) to the U, V and W (three phases).

In the embodiment shown in FIG. 9, the voltage command generation section of the waveform controller 51B is provided with the current command-voltage command conversion function for controlling the applied voltage waveform. To improve the responsivity of the instantaneous torque while controlling the applied voltage waveform, such arrangements can be made that the current command system is provided with a function for waveform control. When the current command system 31 is provided with a function for waveform control, harmonic command (harmonic component command value for controlling the waveform by the function of the rotor magnetic pole position θ) is superimposed on the current commands (Ioq, Iod) to permit direct control of the current waveform. This procedure improves the instantaneous torque. The harmonic command in this case can be the waveform distortion with respect to the fundamental wave. To be more specific, the motor current is controlled by the vector control for providing control in response to the rotor magnetic pole position θ according to the torque current command (q-axis current command) and excited current command (d-axis current command), whereby stable torque control up to the high torque area can be ensured.

The embodiment described above provides a motor drive apparatus capable of continues waveform control by PWM modulation, without the need of switching the drive waveform. Stable torque control up to the high torque area can be ensured in the operation range of the electric actuator subjected to quick acceleration and deceleration. Further, this apparatus provides smooth control of the output torque in response to the steering wheel operation by a driver to ensure continuous assist torque control from the sinusoidal wave drive mode to the rectangular wave drive mode for providing greater output torque. Thus, the aforementioned embodiment of the present invention provides an electric power steering apparatus characterized by smooth operation and excellent response.

Figure 11:
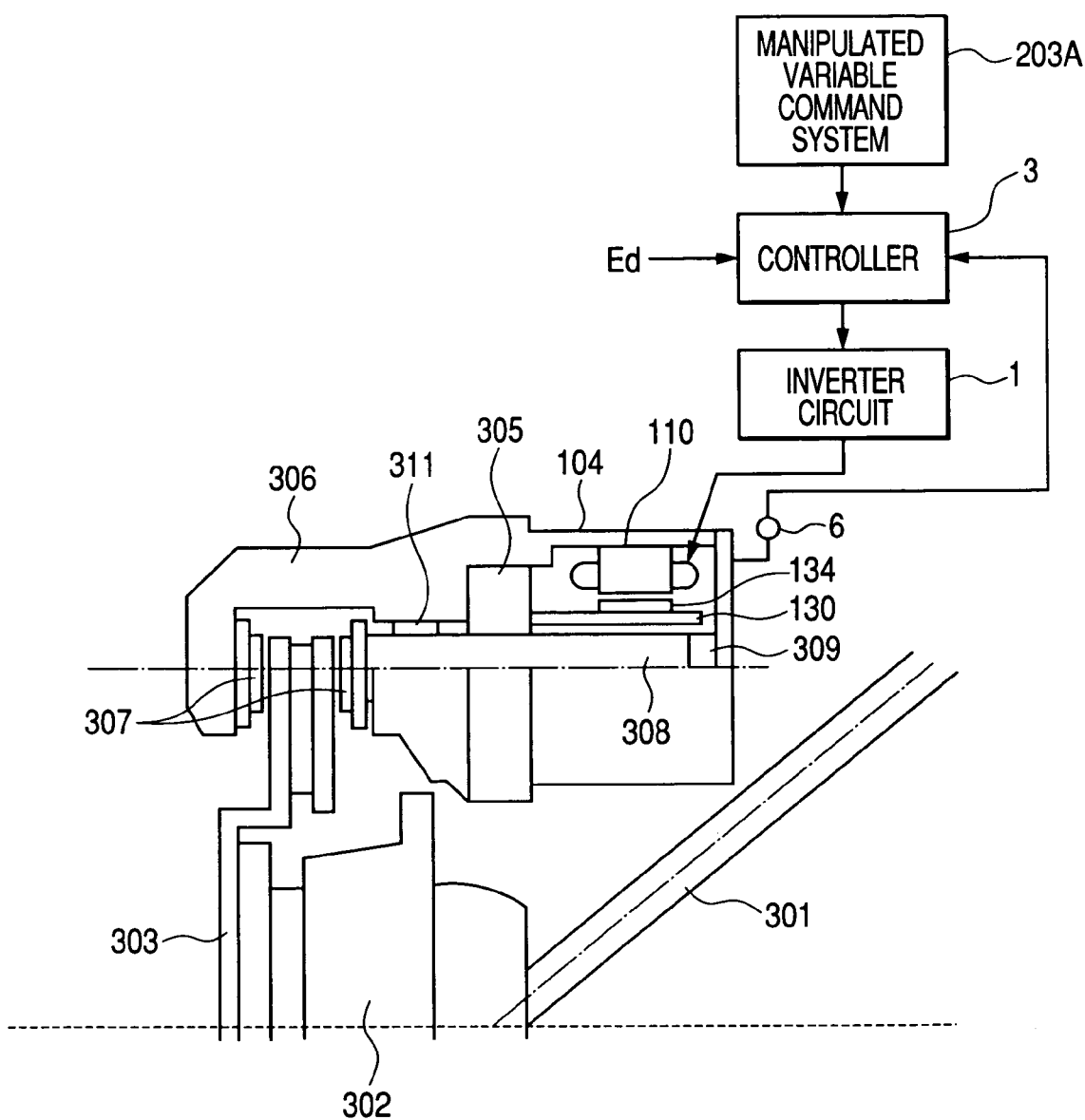
FIG. 11 is a cross sectional view representing the configuration of the electric braking apparatus wherein the motor drive apparatus according to the embodiments of the present invention is used as an electric actuator.

Referring to FIG. 11, the following describes the configuration of the electric braking apparatus wherein the motor drive apparatus of the present embodiment according to the embodiments of the present invention is used as an electric actuator.

FIG. 11 is a cross sectional view representing the configuration of the electric braking apparatus wherein the motor drive apparatus according to the embodiments of the present invention is used as an electric actuator. The same reference numerals as those in FIG. 1 indicate corresponding parts.

The electric braking apparatus has an axle 302 supported by an arm 301 as a support member. The axle 302 is equipped with a disk rotor 303. The disk rotor 303 is sandwiched between brake pads 307, placed on both sides thereof, movable in the axial direction, and is pressed by them, whereby the axle 302 produces braking force.

The motor 100 causes torque to be generated at the rotor 130 as a motor rotor by a stator core 110 equipped with a stator winding and a permanent magnet 134. This torque gives driving force to a piston 308 through a rotation/direct action converter 305. The piston 308 movably supported by support mechanisms 309 and 311 is pressed and gripped through a brake pad 307 from both sides of the disk rotor 303, whereby braking force is produced. A claw 306 and a caliper proper 304 are movably supported by a support pair.

The manipulated variable command system 203A outputs the torque command conforming to the brake pedal stroke, pedal step-on speed and car speed to the controller 3. In response to the inputted torque command, the controller 3 outputs PWM modulation signal of the sinusoidal wave or the sinusoidal wave plus odd-numbered high-order harmonic to the inverter circuit 1, thereby driving the motor 100. In this case, in response to the degree of voltage saturation based on the battery voltage Ed, the controller 3 provides continuous control of the PWM modulated waveform. Further, the controller 3 also provides waveform control according to the position of the magnet detected by the rotating position detecting circuit 6.

The motor 100 and controller 3 described above are used in a electric braking apparatus. This method allows continues waveform control by PWM modulation, without the need of switching the drive waveform, and ensures stable torque control up to the high torque area.

What is claimed is:
1. A motor drive apparatus comprising:
a 3-phase a.c. driven motor;
an inverter for driving said motor based on a battery voltage;
a first current detector for detecting a direct current flowing to said inverter;
a plurality of second current detectors for detecting the motor current flowing to said motor; and
a controller for controlling the drive of said inverter based on the current value detected by said first and/or second current detectors, and for driving the motor while controlling the torque of said motor;
wherein said controller converts the drive waveform of said inverter into the waveform created by superimposing harmonics of high odd-numbered order on a sinusoidal wave as a fundamental wave of the modulated wave modulated by a PWM carrier wave; and continuously changes the ratio of superimposing said high-order harmonics, based on said battery voltage.

2. The motor drive apparatus described in claim 1 wherein said controller comprises:
a voltage saturation detecting unit for detecting the saturation of said inverter output voltage based on said battery voltage; and
a waveform control unit for converting the drive waveform of said inverter into the waveform created by superimposing harmonics of high odd-numbered order on a sinusoidal wave as a fundamental wave of the modulated wave modulated by a PWM carrier wave; and for continuously changing the ratio of superimposing said high-order harmonics, in response to the degree of voltage saturation measured by said voltage saturation detecting unit.

3. The motor drive apparatus described in claim 1, further characterized in that said controller comprises:
a step of obtaining the voltage command value from the deference between a current command value based on a torque command value and the current value detected by said first and/or second current detectors;
a step of calculating a superimpose ratio based on the voltage of said battery as a parameter; and
a step of superimposing the high odd-numbered order harmonics on the fundamental sinusoidal wave in accordance with said superimpose ratio.

4. The motor drive apparatus described in claim 1, further comprising a rotating position detector for detecting the rotating position of said motor, wherein said controller comprises:
a step of controlling the motor current based on the vector control according to the torque current command (q-axis current command) and exciting current command (d-axis current command); and
a step of controlling said motor current based on the rotating position of the rotor detected by said rotating position detector.

5. The motor drive apparatus described in claim 1, further characterized in that said controller comprises a current correcting unit, wherein said controller comprises:
a step of comparing the direct current value detected by said first current detector with the motor current detected by said second current detectors;
a step of detecting the detection error level of said current detector; and
a step of obtaining the motor current value of the faulty phase, using the motor currents of other two phases, if the detection error range for the motor current value of any one phase in the three-phase motor current values is narrower than a predetermined electrical angle.

6. The motor drive apparatus described in claim 5, wherein, if the detection error range for the motor current value of at least one phase in the three-phase motor current values is greater than a predetermined electrical angle, said current correcting unit estimates the motor current value of the faulty phase using the motor currents of other phases and said direct current values.

7. The motor drive apparatus described in claim 5, wherein said waveform control unit converts the drive waveform into a 120-degree rectangular wave if a detection error level has been detected to be within the range involving difficulties in detecting all the motor current values at the same time.

8. The motor drive apparatus described in claim 5, further characterized in that said current correcting unit compares said direct current instantaneous value with said motor current value at intervals of 60-degree period in terms of motor electrical angle, and detects the detection error level, wherein the direct current value whose resolution is equivalent to or higher than the resolution of said motor current value is used as an input; and the peak value within the PWM period of said direct current value having been detected is held as the direct current instantaneous value.

9. A motor drive apparatus comprising:

a 3-phase a.c. driven motor;

an inverter for driving said motor based on a battery voltage;

a first current detector for detecting a direct current flowing to said inverter;

a plurality of second current detectors for detecting the motor current flowing to said motor; and a controller for controlling said inverter by PWM based on the current value detected by said first andior second current detectors, and for driving the motor while controlling the torque of said motor; wherein said controller comprises:

a step of comparing a PWM pulse width of each chase with a predetermined value; and a step of obtaining the motor current of the chase whose PWM pulse width is wider than the predetermined value based on the motor current of at least one of other phases and the direct current if the PWM pulse width of the phase is wider than the predetermined value.

10. An electric actuator comprising:

a 3-phase a.c. driven motor;

an inverter for driving said motor based on a battery voltage;

a first current detector for detecting a direct current flowing to said inverter;

a plurality of second current detectors for detecting the motor current flowing to said motor;

a controller for controlling the drive of said inverter based on the current value detected by said first and/or second current detectors, and for driving the motor while controlling the torque of said motor; and a torque transmitter for transmitting the drive torque of said motor to a driven member;

wherein said controller converts the drive waveform of said inverter into the waveform created by superimposing harmonics of high odd-numbered order on a sinusoidal wave as a fundamental wave of the modulated wave modulated by a PWM carrier wave; and continuously changes the ratio of superimposing said high-order harmonics, based on said battery voltage.

11. An electric power steering apparatus comprising the electric actuator described in claim 10.

* * * * *